United States Patent
Reynolds

(10) Patent No.: US 9,427,861 B2
(45) Date of Patent: Aug. 30, 2016

(54) BIT TOOL HAVING A BIT STORAGE MEMBER, LIGHT ASSEMBLY FOR A BIT TOOL AND BIT TOOL HAVING A RATCHETING HANDLE ASSEMBLY

(71) Applicant: Sicom Industries Ltd., Langley (CA)

(72) Inventor: Mark F. Reynolds, Langley (CA)

(73) Assignee: Sicom Industries Ltd., Langley (CA)

( * ) Notice: Subject to any disclaimer, the term of this patent is extended or adjusted under 35 U.S.C. 154(b) by 268 days.

(21) Appl. No.: 14/194,464

(22) Filed: Feb. 28, 2014

(65) Prior Publication Data

US 2014/0310882 A1 Oct. 23, 2014

Related U.S. Application Data

(60) Provisional application No. 61/770,992, filed on Feb. 28, 2013.

(51) Int. Cl.

| | |
|---|---|
| *B25G 1/08* | (2006.01) |
| *B25B 23/00* | (2006.01) |
| *B25F 1/02* | (2006.01) |
| *B25B 15/04* | (2006.01) |
| *B23B 45/06* | (2006.01) |
| *B25F 1/04* | (2006.01) |
| *B25F 5/02* | (2006.01) |

(52) U.S. Cl.
CPC .............. *B25G 1/085* (2013.01); *B23B 45/06* (2013.01); *B25B 15/04* (2013.01); *B25F 1/02* (2013.01); *B25F 1/04* (2013.01); *B25F 5/029* (2013.01)

(58) Field of Classification Search
CPC ............ B25G 1/085; B25F 1/02; B25F 1/04; F21V 33/008; F21V 33/0084; B23B 45/06; B25B 15/04; B25B 23/00
See application file for complete search history.

(56) References Cited

U.S. PATENT DOCUMENTS

| | | |
|---|---|---|
| 2,013,765 A | 9/1935 | Richardson |
| 3,256,966 A | 6/1966 | Angquist |
| 3,372,612 A | 3/1968 | Rozmus |
| 3,742,787 A | 7/1973 | Whiteford |
| 3,824,881 A | 7/1974 | Wright |
| 3,844,322 A | 10/1974 | Stoutenberg |
| 4,212,336 A | 7/1980 | Smith |
| 4,466,523 A | 8/1984 | De Carolis et al. |
| 4,541,314 A | 9/1985 | Korkowski |
| 4,621,718 A | 11/1986 | DeCarolis |

(Continued)

FOREIGN PATENT DOCUMENTS

WO 0034012 6/2000

*Primary Examiner* — David B Thomas
(74) *Attorney, Agent, or Firm* — Cameron IP

(57) ABSTRACT

According to one aspect, there is provided a bit tool having a bit storage member for housing a plurality of bits. The member includes an exterior which is at least partially transparent. A light assembly extends around the bit storage member and selectively illuminates the bit storage member to reveal the bits. According to another aspect, the tool has a pushrod for operatively selecting bits and a locking assembly that may be actuated for selectively coupling the pushrod and a respective one of the bits together to operate the tool. According to a further aspect, there is provided a ratcheting handle assembly which includes at least one catch member operatively connected to and linearly moveable relative to an inner core. A selector member actuates respective ones of the catch members for selectively causing the handle assembly to ratchetly drive the inner core in forward and reverse positions.

25 Claims, 27 Drawing Sheets

(56) References Cited

U.S. PATENT DOCUMENTS

| | | | |
|---|---|---|---|
| 6,098,500 A | 8/2000 | Roberts et al. | |
| 6,186,031 B1 | 2/2001 | Shiao | |
| 6,601,483 B2 | 8/2003 | Wannop | |
| 6,725,749 B1* | 4/2004 | Liou | B25B 23/0035 81/438 |
| 6,854,363 B2* | 2/2005 | Ping | B25B 15/04 192/43.2 |
| 6,916,106 B2* | 7/2005 | Xingguo | B25B 13/56 362/120 |
| 6,922,864 B2 | 8/2005 | Clarke et al. | |
| 6,928,908 B1* | 8/2005 | Yu | B25B 15/04 81/177.4 |
| 7,055,411 B2* | 6/2006 | Huang | B25B 13/465 192/43.2 |
| 7,086,314 B2* | 8/2006 | Wannop | B25G 1/085 81/439 |
| 7,188,555 B2* | 3/2007 | Beauchamp | B25G 1/085 81/177.4 |
| 7,237,458 B2* | 7/2007 | Shiao | B25B 13/463 81/439 |
| 7,275,466 B2* | 10/2007 | Cluthe | B25G 1/085 81/177.4 |
| 7,434,493 B2* | 10/2008 | Huang | B25B 13/465 192/43.2 |
| 7,493,838 B2* | 2/2009 | Beauchamp | B25G 1/085 81/177.1 |
| 7,562,606 B2* | 7/2009 | Grand | B25G 1/085 483/57 |
| 7,677,138 B2* | 3/2010 | Lin | B25B 15/04 81/58.1 |
| 7,866,839 B2* | 1/2011 | Chien | B25B 15/02 362/119 |
| 7,926,391 B2* | 4/2011 | Hu | B25B 15/04 81/436 |
| 7,934,847 B2* | 5/2011 | Oomori | B25B 23/18 362/119 |
| 7,993,023 B2* | 8/2011 | Wang | B25B 23/18 362/119 |
| 8,016,048 B2* | 9/2011 | Ueda | B25B 21/00 173/171 |
| 8,122,791 B2 | 2/2012 | Klomp | |
| 8,231,512 B2* | 7/2012 | Schmidt | B25F 5/029 483/39 |
| 8,517,558 B2* | 8/2013 | Oomori | B25B 23/18 173/20 |
| 8,522,651 B2* | 9/2013 | Xu | B25B 15/04 81/60 |
| 9,156,145 B2* | 10/2015 | Wang | B25B 13/462 81/57.29 |
| 2006/0075852 A1 | 4/2006 | Hu | |
| 2006/0201290 A1* | 9/2006 | Rodgers | B25G 1/085 81/439 |
| 2006/0248987 A1 | 11/2006 | White et al. | |
| 2009/0199683 A1* | 8/2009 | Hu | B25B 15/04 81/63.1 |
| 2009/0293683 A1* | 12/2009 | Chen | B25B 15/04 81/63.1 |
| 2013/0244845 A1* | 9/2013 | Nagy | B25F 5/029 483/12 |
| 2014/0041489 A1* | 2/2014 | Chien | B25B 13/06 81/62 |
| 2014/0196575 A1* | 7/2014 | Wang | B25B 13/465 81/60 |

\* cited by examiner

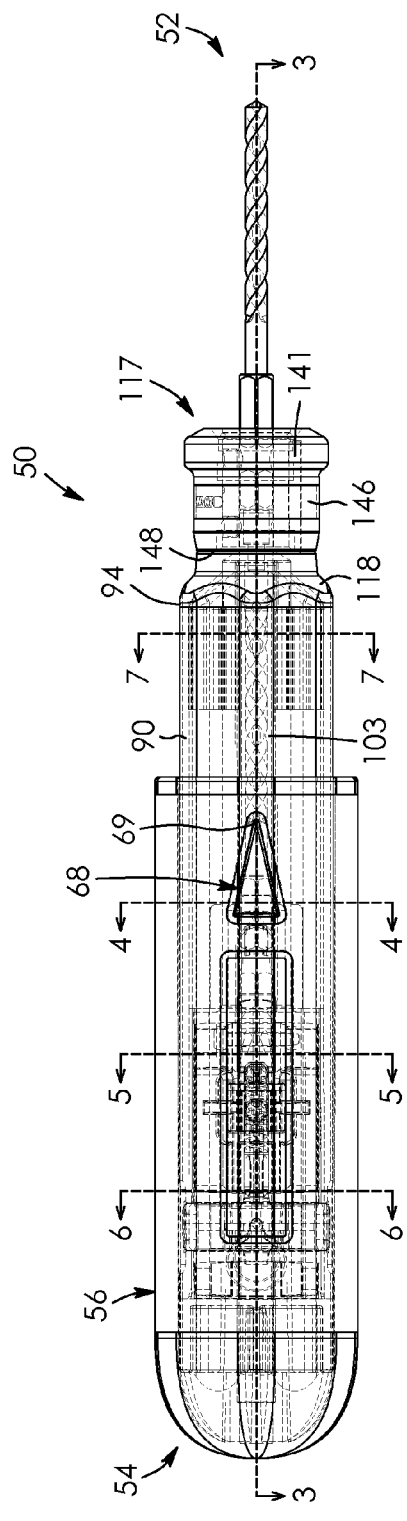
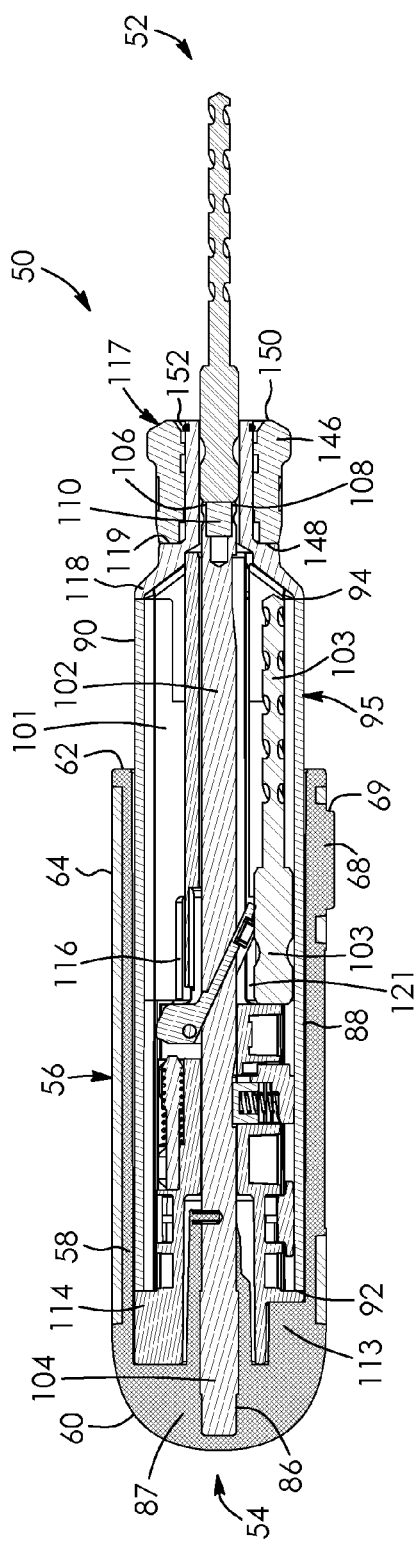
FIG. 2
FIG. 3

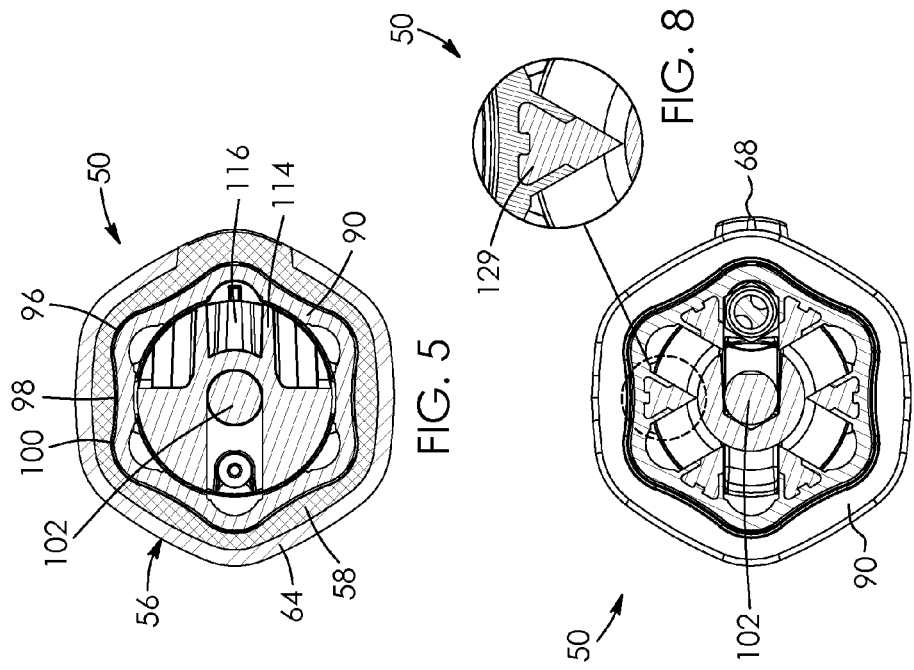
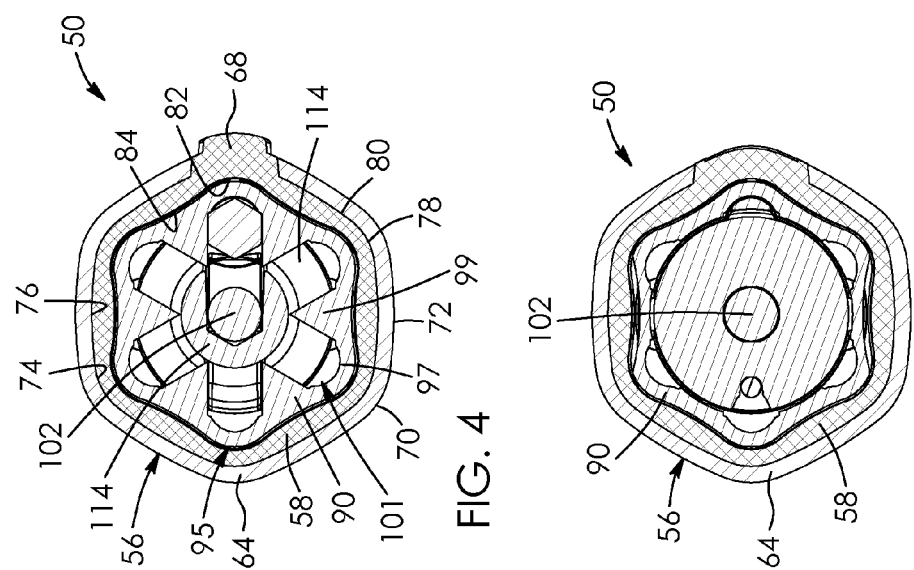

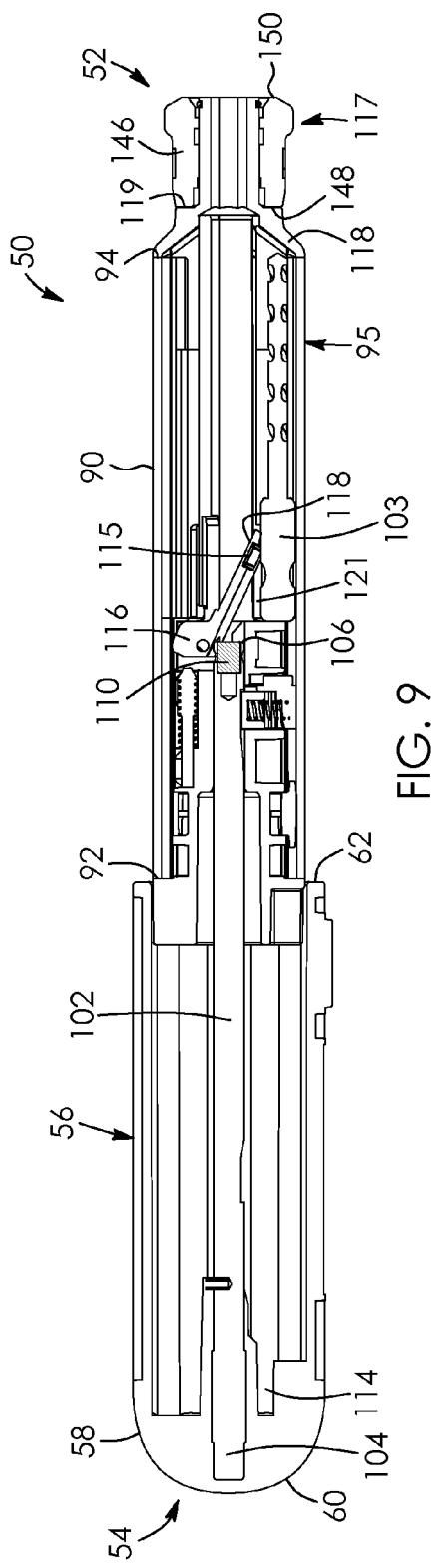
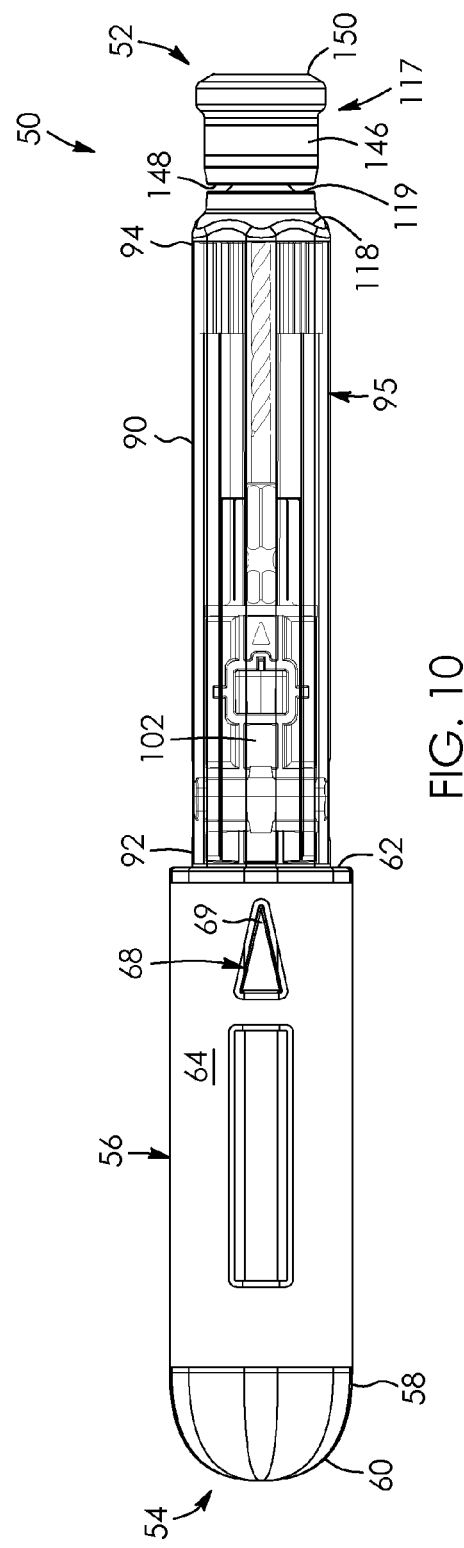
FIG. 9
FIG. 10

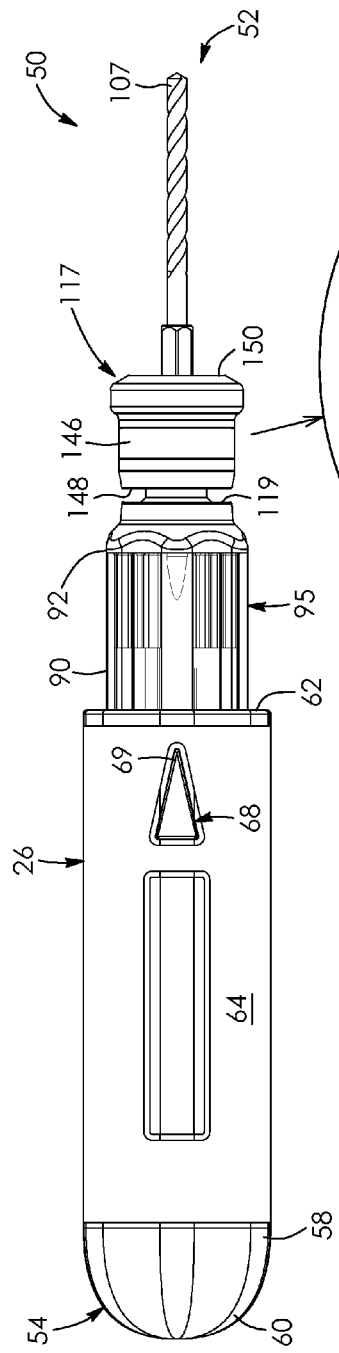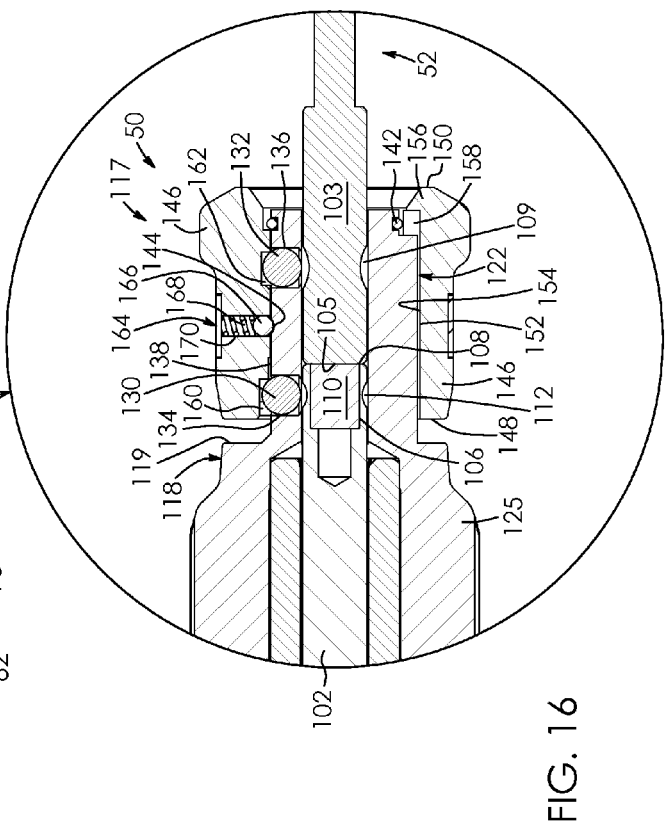
FIG. 15
FIG. 16

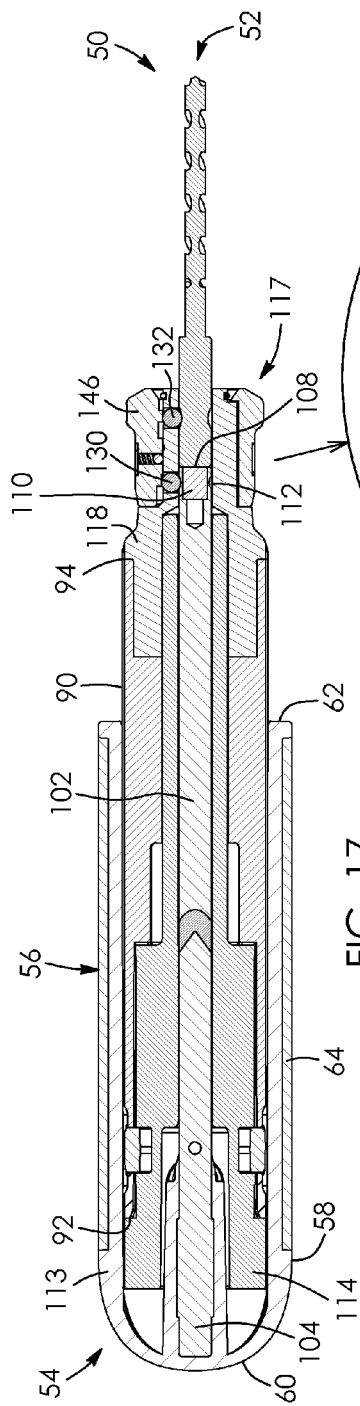
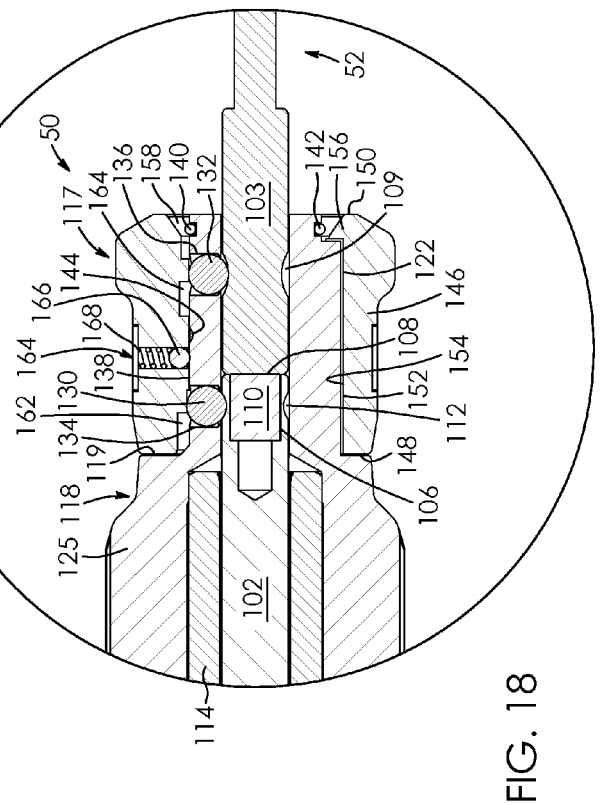
FIG. 17
FIG. 18

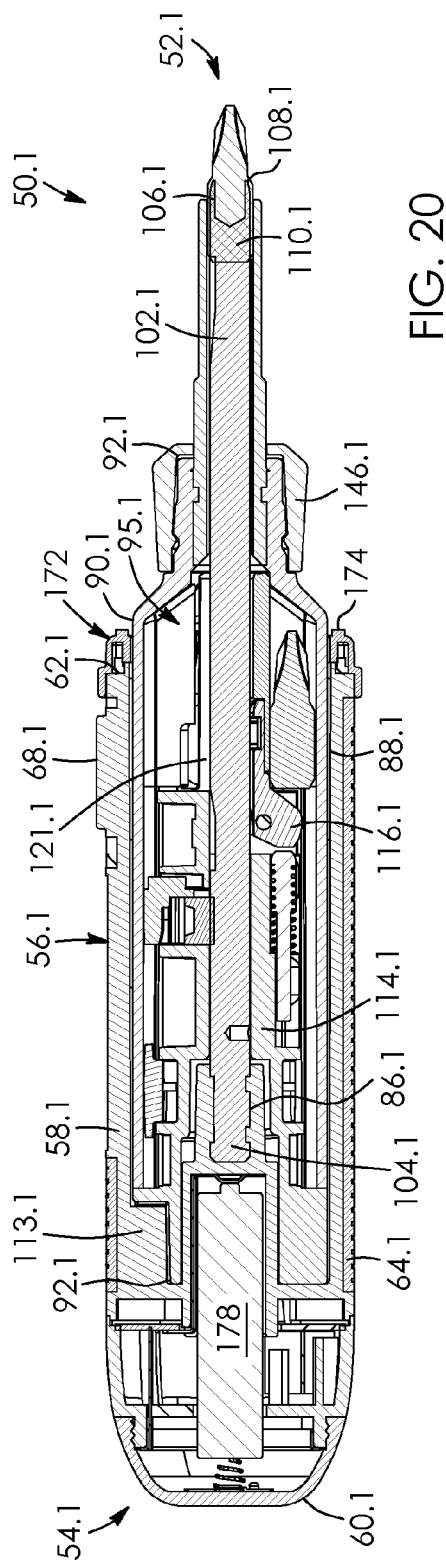
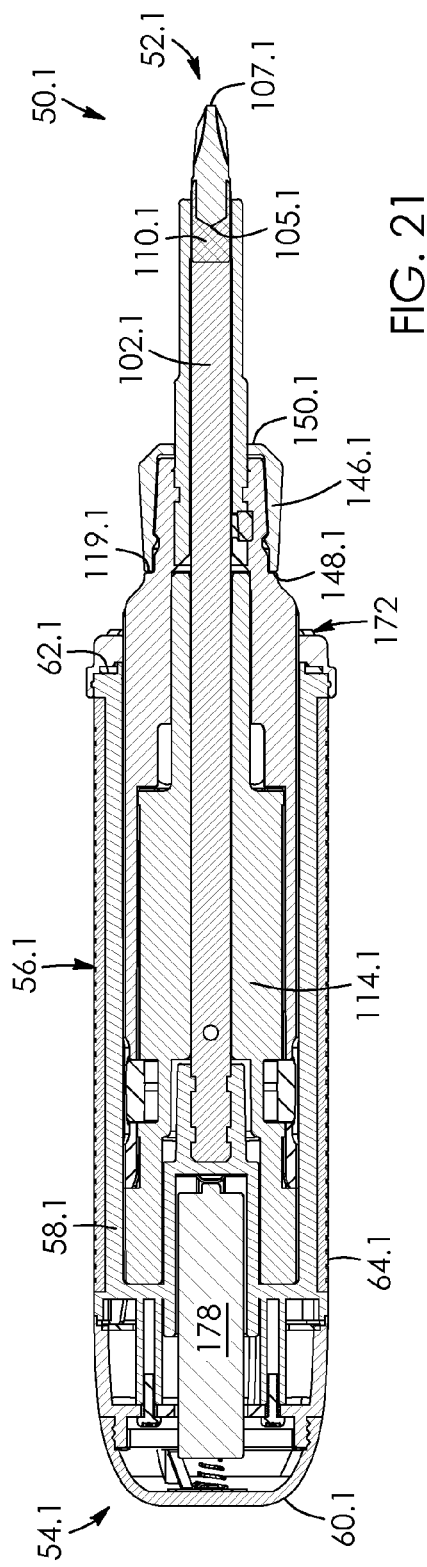
FIG. 20
FIG. 21

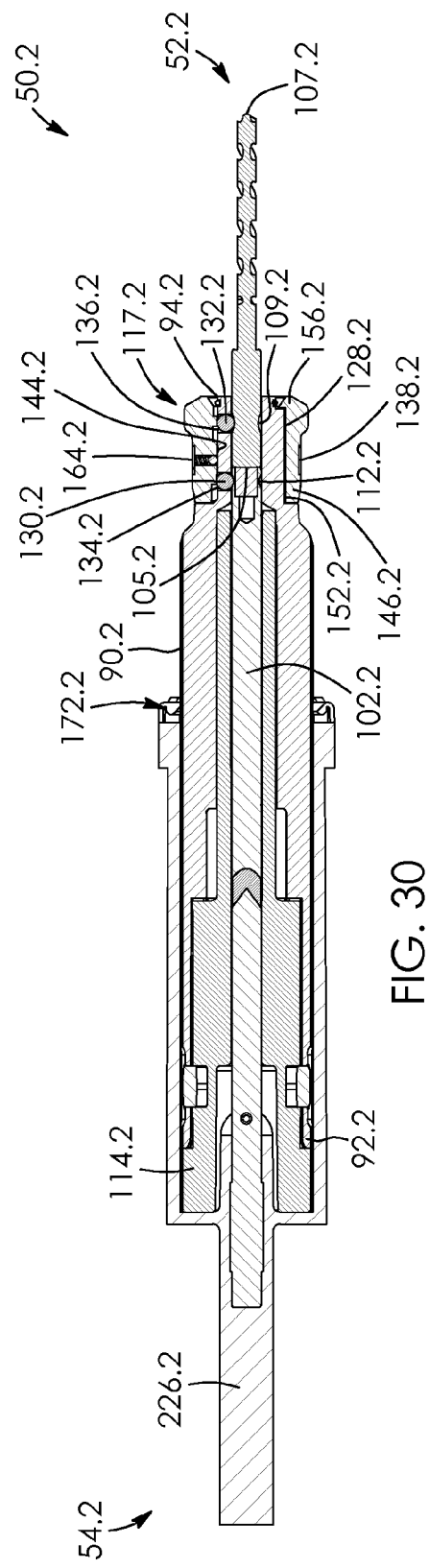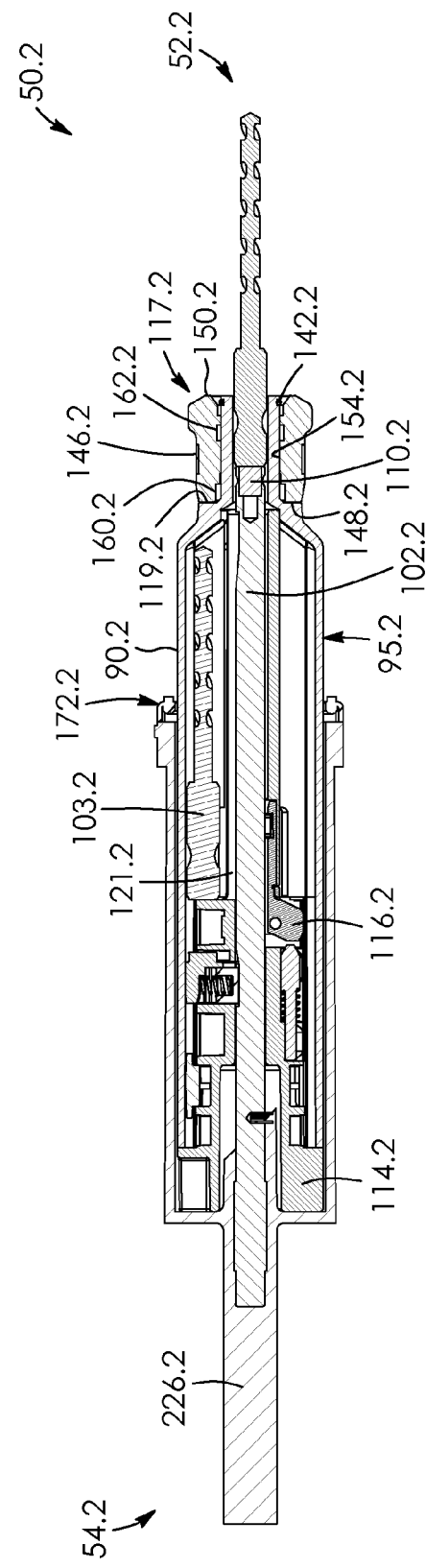

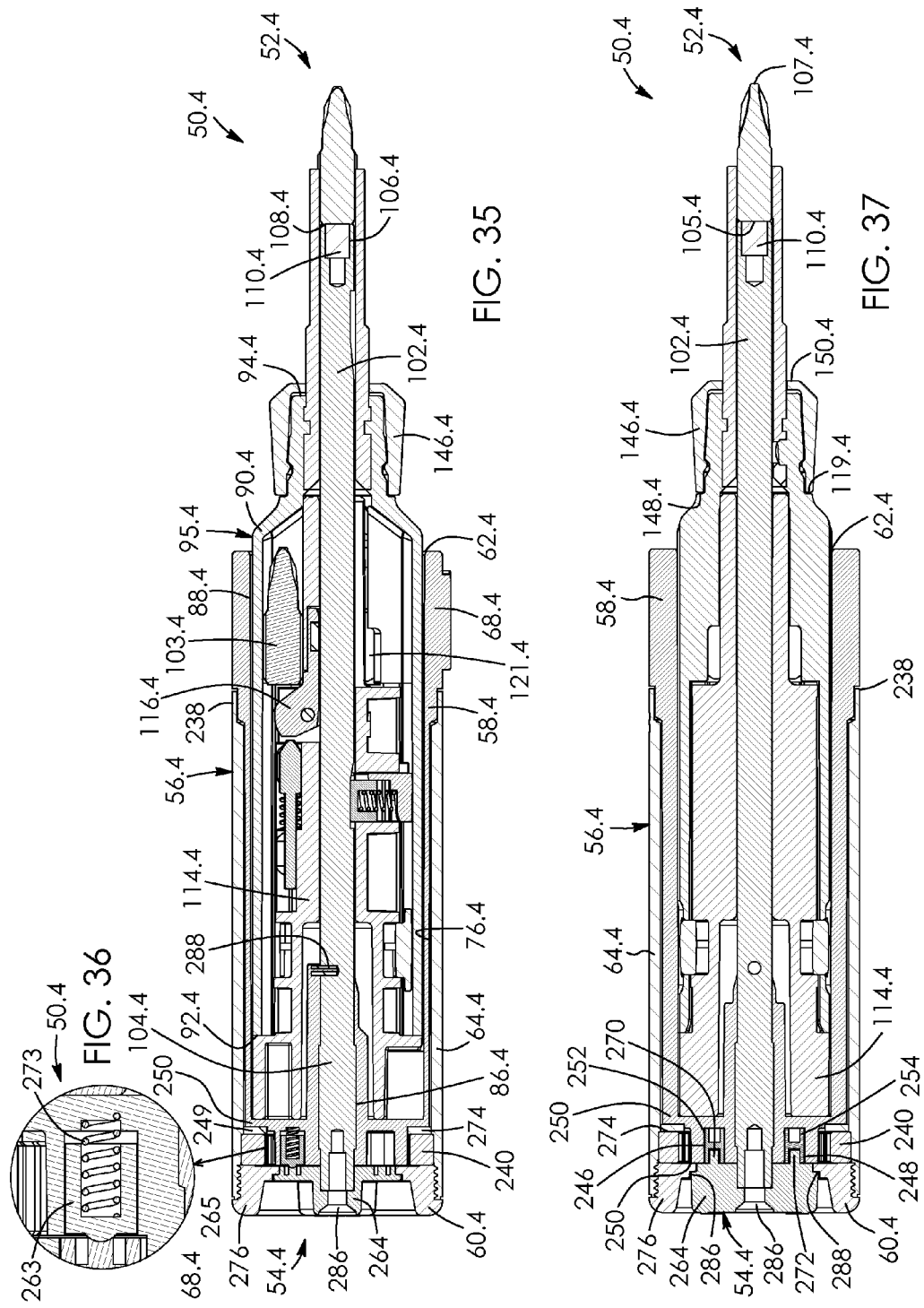

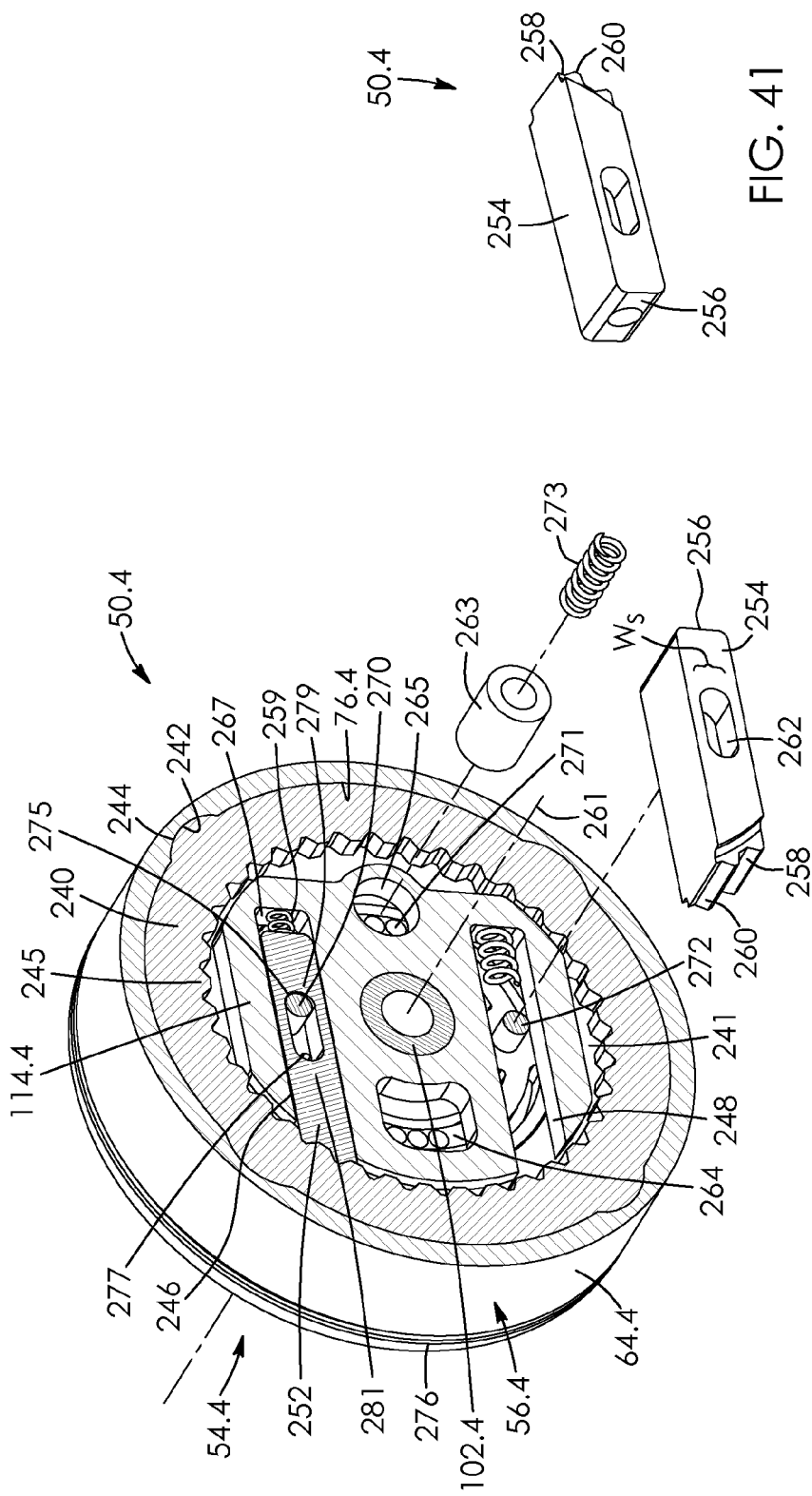

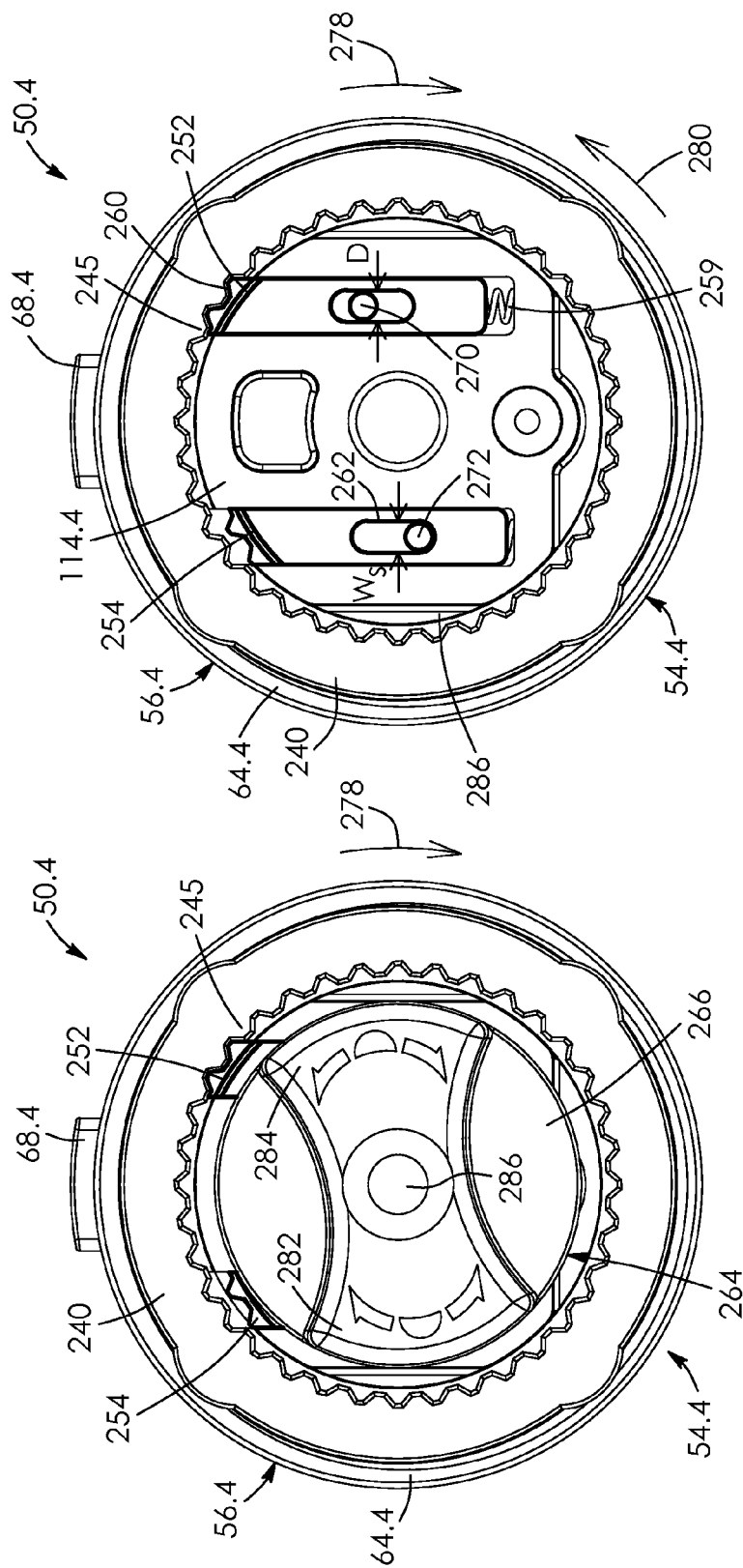

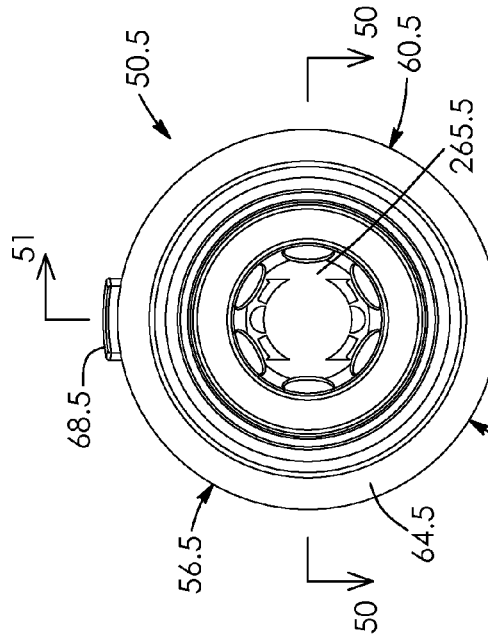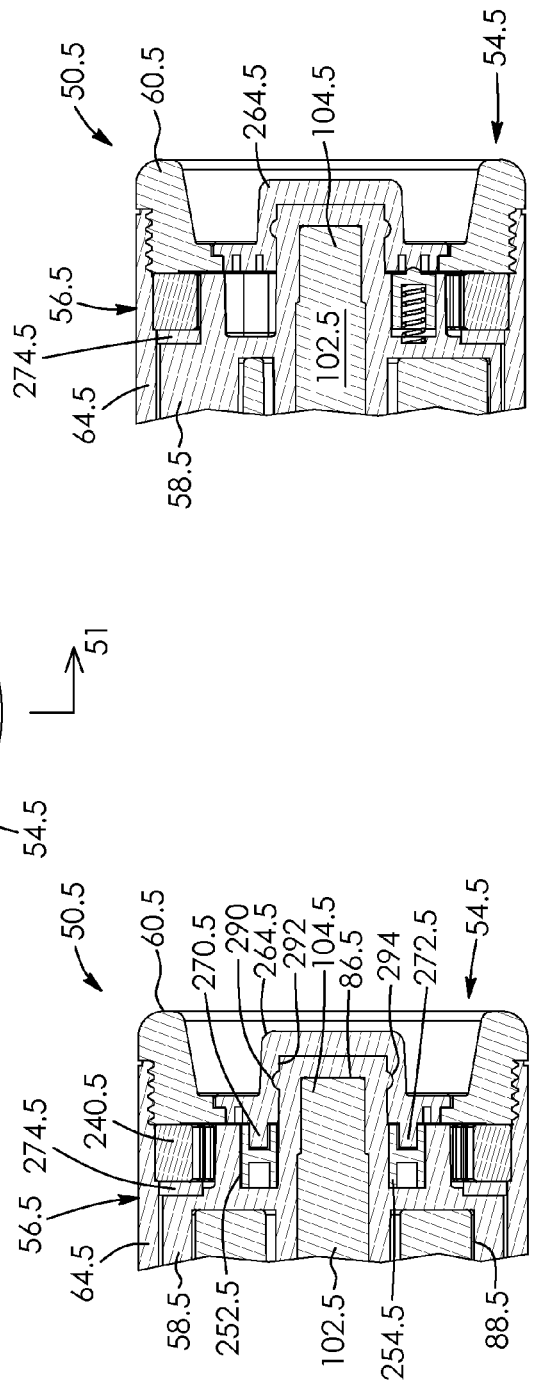

BIT TOOL HAVING A BIT STORAGE MEMBER, LIGHT ASSEMBLY FOR A BIT TOOL AND BIT TOOL HAVING A RATCHETING HANDLE ASSEMBLY

FIELD OF THE INVENTION

There is provided a bit tool. In particular, there is provided a bit tool having a bit storage member, a bit tool having a light assembly and a bit tool having a ratcheting handle assembly.

DESCRIPTION OF THE RELATED ART

U.S. Pat. No. 6,601,483 to Wannop discloses a screwdriver with a bit storage member rotatable about a slotted, apertured core. A magnet-tipped pushrod slides through the core. A magnetic lever arm is pivotally coupled to the shaft and biased toward its slot. The rod moves through the bit storage member between extended and retracted positions.

In the extended position, the core is rotatable with respect to the bit storage member to position the slot adjacent a bit storage cavity. Also, the lever arm is pivotally biased toward and through the slot. The lever arm so positioned magnetically attracts the tool bit in the cavity.

While the rod moves into the retracted position, the bit storage member is not rotatable about the core. Also, the rod pushes the lever arm and bit away from the cavity, through the slot and into the core. The rod's magnet moves forwardly and magnetically attracts the bit. The rod pushes the bit forwardly through a shaft to protrude through the shaft's open forward end.

While the above screwdriver may function well according to many aspects, there is a need for a yet further improved bit tool.

BRIEF SUMMARY OF INVENTION

There is provided a bit tool disclosed herein that may represent an improvement over bit tools of the known prior art.

There is accordingly provided a bit tool having a bit storage member for housing a plurality of bits. The bit storage member includes an exterior which is at least partially transparent. The bit tool includes a light assembly shaped to extend around the bit storage member. The light assembly selectively illuminates the bit storage member to reveal the bits.

There is also provided a bit tool having at least one bit. The tool includes an inner tube having a pair of spaced-apart apertures transversely extending therethrough. The tool includes a pushrod that selectively extends the bit partially outwards from the tube. The tool includes a pair of locking members positioned within respective ones of the apertures of the tube. The tool includes a collar extending around and slidably connecting to the tube. The collar is moveable to selectively bias the locking members radially inwards to abut the bit and the pushrod, respectively, for selectively coupling the bit and the pushrod together thereby.

There is further provided a bit tool having a housing. The tool includes an outer sleeve rotatably mounted to the housing. The tool has an inner sleeve for storing a plurality of bits including a drill bit and a screwdriver bit. The inner sleeve is selectively received within the outer sleeve. The tool includes a locking assembly. The tool includes a pushrod coupled to the outer sleeve for selectively pushing one of the bits towards the locking assembly. The locking assembly selectively couples the pushrod and said one of the bits to the outer sleeve for retaining the pushrod and said one bit in place.

There is yet further provided a bit tool having means for storing a plurality of bits including a drill bit and a screwdriver bit. The tool includes means for retrieving one of the bits for use with the bit tool. The tool includes means for securing the bit in place.

According to another aspect, there is provided a hand tool having a longitudinally-extending inner core. The tool includes at least one catch member operatively connected to and linearly moveable relative to the inner core. The tool includes a handle assembly at least partially extending around and having a plurality of gear teeth facing the inner core. The catch member spring-biases outwards towards the gear teeth. The catch member enables the handle assembly to rotate in a first direction relative to the inner core and engages the gear teeth to couple the handle assembly to the inner core when the handle assembly is rotated in a second direction.

According to yet another aspect, there is provided a hand tool having a longitudinally-extending inner core. The tool includes a pair of catch members operatively connected to and spring-biased to move linearly outwards relative to the inner core. The tool includes a handle assembly extending around the inner core. The handle assembly has a plurality of gear teeth facing the inner core. The tool includes a selector member configured to actuate respective ones of the catch members for selectively causing the handle assembly to ratchetly drive the inner core in forward and reverse positions.

BRIEF DESCRIPTION OF DRAWINGS

The invention will be more readily understood from the following description of preferred embodiments thereof given, by way of example only, with reference to the accompanying drawings, in which:

FIG. 2 is a top plan view thereof partially shown in ghost to reveal interior parts of the hand drill;

FIG. 3 is a sectional view of the hand drill of FIG. 2 taken along lines 3-3 of FIG. 2;

FIG. 4 is a sectional view of the hand drill of FIG. 2 taken along lines 4-4 of FIG. 2;

FIG. 5 is a sectional view of the hand drill of FIG. 2 taken along lines 5-5 of FIG. 2;

FIG. 6 is a sectional view of the hand drill of FIG. 2 taken along lines 6-6 of FIG. 2;

FIG. 7 is a sectional view of the hand drill of FIG. 2 taken along lines 7-7 of FIG. 2;

FIG. 8 is an enlarged view of part of the sectional view of the hand drill shown in FIG. 7;

FIG. 9 is a sectional view of the hand drill similar to FIG. 3, the hand drill being shown in an extended, locked mode;

FIG. 10 is a top plan view thereof, the hand drill being shown in an extended, unlocked mode;

FIG. 15 is a top plan view of the hand drill of FIG. 1, the hand drill being shown in a retracted, unlocked mode;

FIG. 16 is an enlarged sectional view similar to FIG. 17 of the locking assembly of the hand drill of FIG. 15, the locking assembly and drill being shown in an unlocked mode;

FIG. 17 is a sectional view of the hand drill of FIG. 1 taken along lines 17-17 of FIG. 1, the hand drill being shown in the retracted, locked mode;

FIG. 18 is an enlarged sectional view of the locking assembly of the hand drill of FIG. 17, the locking assembly and drill being shown in a locked mode;

FIG. 20 is a sectional view of the screwdriver of FIG. 19 taken along lines 20-20 of FIG. 19;

FIG. 21 is a sectional view of the screwdriver of FIG. 19 taken along lines 21-21 of FIG. 19;

FIG. 30 is a sectional view of a removable portion of the power tool of FIG. 25 taken along lines 30-30 of the power tool of FIG. 25, the removable portion being selectively driven by the motor of the power tool;

FIG. 31 is a sectional view similar to FIG. 28 of the removable portion of the power tool of FIG. 28;

FIG. 35 is a sectional view of the screwdriver of FIG. 34 taken along lines 35-35 of the screwdriver of FIG. 34;

FIG. 36 is an enlarged view of a portion of the screwdriver of FIG. 35 showing a spring-biased knob of the screwdriver in greater detail;

FIG. 37 is a sectional view of the screwdriver of FIG. 34 taken along lines 37-37 of the screwdriver of FIG. 34;

FIG. 40 is a sectional view of the screwdriver of FIG. 34 taken along lines 40-40 of the screwdriver of FIG. 34, with one of the catch members of the screwdriver and the spring-biased knob of the screwdriver being shown in exploded views;

FIG. 41 is a rear perspective view of said one of the catch members of the screwdriver of FIG. 40;

FIG. 42 is a rear elevation view of the ratchet assembly of the screwdriver of FIG. 34, with an end cap of the handle assembly being partially removed to reveal a ring gear, the selector member interposed between a pair of spaced-apart wall portions of the end cap and a pair of spaced-apart, transversely catch members, a first one of the catch members radially extending outwards and engaging with the ring gear, a second one of the catch members being actuated inwardly by the selector member, and the ratchet assembly being shown in a forward position to permit clockwise rotation from the perspective of FIG. 42;

FIG. 43 is a rear elevation view of the ratchet assembly of FIG. 42 with the selector member and other portions of the handle assembly being removed to reveal the catch members, the ratchet assembly being shown in the forward position;

FIG. 49 is a rear elevation, assembled view of the screwdriver of FIG. 48;

FIG. 50 is a sectional view of the screwdriver of FIG. 49 taken along lines 50-50 of the screwdriver of FIG. 49, the screwdriver being shown in fragment and showing a rear portion thereof; and FIG. 51 is a sectional view of the screwdriver of FIG. 49 taken along lines 51-51 of the screwdriver of FIG. 49, the screwdriver being shown in fragment and showing the rear portion thereof.

DESCRIPTION OF THE PREFERRED EMBODIMENTS

Figure 1:
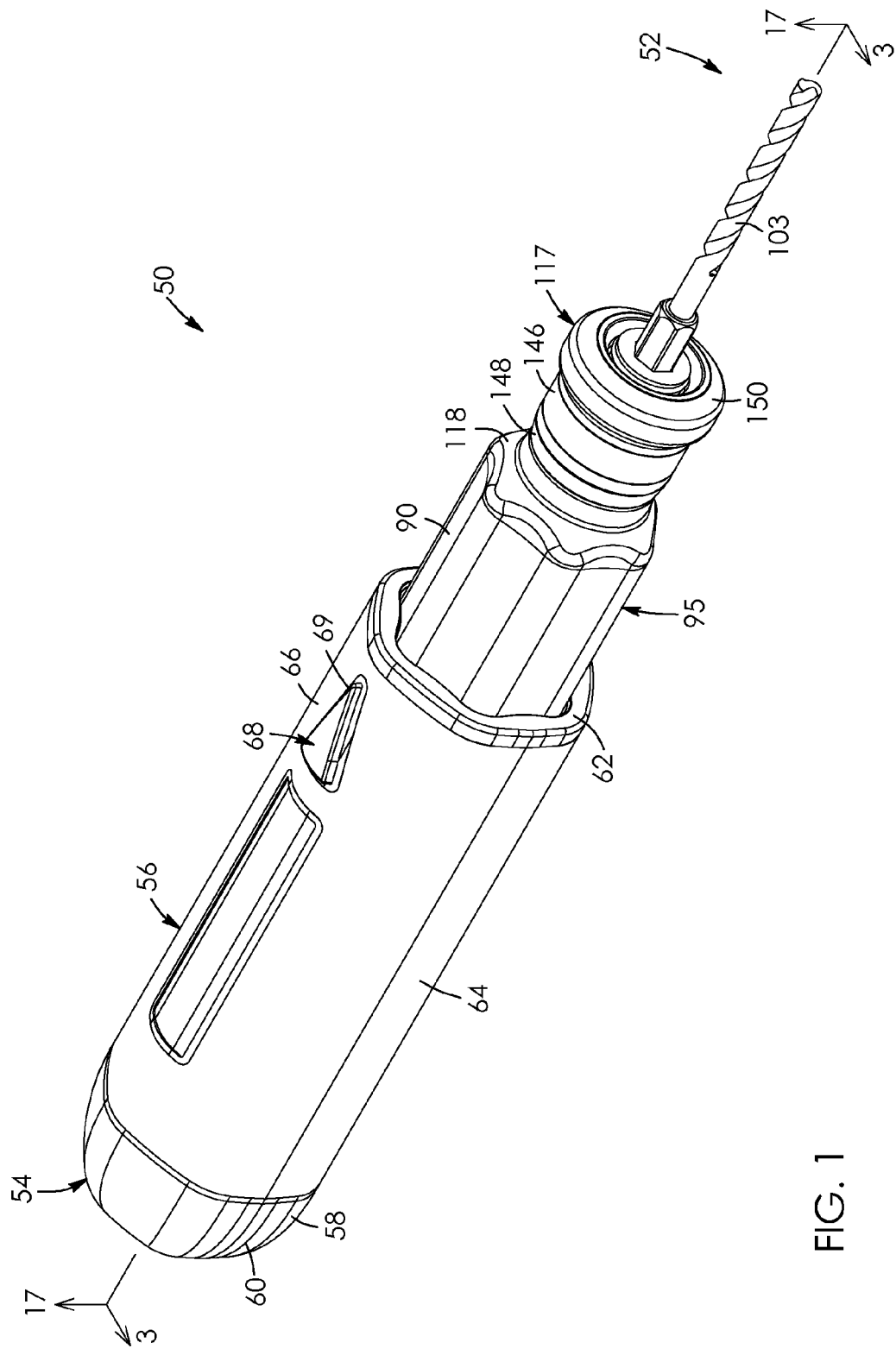
FIG. 1 is a front perspective view of a bit tool according to a first aspect, in this example in the form of a hand drill, the hand drill being shown in a retracted, locked mode.
Figure 12:
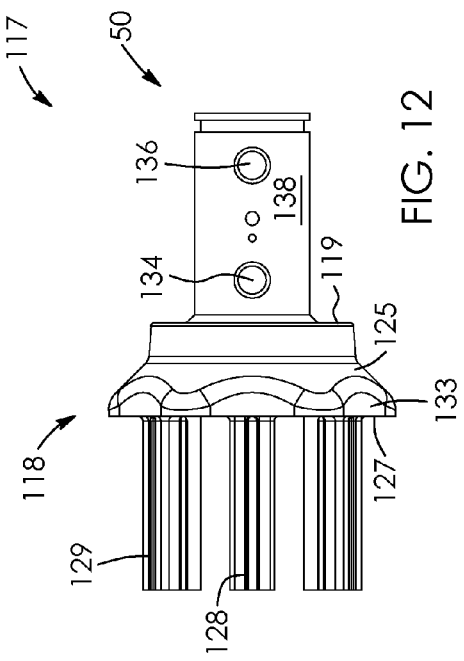
FIG. 12 is a side elevation view thereof.
Figure 14:
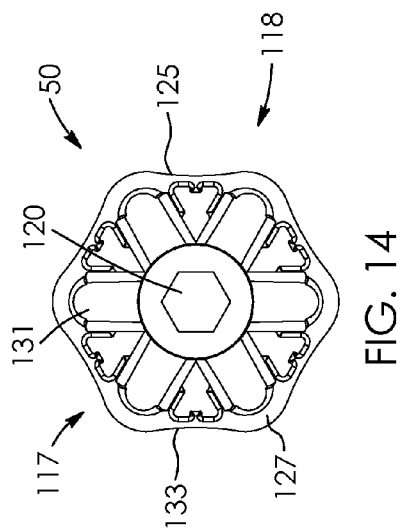
FIG. 14 is a rear elevation view thereof.

Referring first to FIG. 1, there is provided a bit tool, in this example in the form of a hand drill 50. The hand drill has a front end 52 and a rear end 54 spaced-apart from the front end. The drill has a hollow hand grip, or handle assembly 56, which extends from the rear end towards the front end of the drill 50.

As seen in FIGS. 1 and 3, the handle assembly includes an outer sleeve or tube 58 having a closed end 60 at the rear end 54 of the drill and an open end 62 spaced-apart from the closed end. The outer tube extends from the rear end of the drill towards the front end thereof. An exterior tubular gripping member 64 extends around tube 58 in this example, from open end 62 of the tube towards end 54 of the drill, for further facilitating gripping of the drill. The gripping member 64 is positioned between ends 60 and 62 and is coupled to tube 58 in this example.

As seen in FIG. 1, the handle assembly 56 has an exterior 66 and the drill 50 includes an anti-roll projection 68 radially extending outwards from said exterior in this example. The projection is shaped to inhibit the drill from rolling away when not in use and is in the shape of a longitudinally-extending triangular prism in this example. Projection 68 is positioned by open end 62 of the assembly 56 in this example.

As seen in FIG. 4, the gripping member 64 comprises a plurality of circumferentially spaced-apart, longitudinally-extending ridges 70 on its exterior 72 and a plurality of corresponding circumferentially spaced-apart, longitudinally-extending grooves 74 within its interior 76. The gripping member is hexagonal in cross-section in this example, though this is not strictly required. Similarly, tube 58 includes a plurality of circumferentially spaced-apart, longitudinally extending ridges 78 on its exterior 80 shaped to be received by grooves 74 of the gripping member 64. Tube 58 has a plurality of circumferentially spaced-apart, longitudinally extending grooves 82 on its interior 84.

As seen in FIG. 3, the handle assembly 56 includes an inner central bore 86 adjacent to its rear end 54 and an outer central bore 88 that extends from open end 62 of the tube 58 towards the rear end 60 thereof.

The drill 50 includes an inner sleeve 90. The inside diameter of tube 58 is slightly greater than the outside diameter of inner sleeve 90 to allow the inner sleeve and tube 58 to telescopically reciprocate with respect to one another. Sleeve 90 is also rotatable relative to handle assembly 56 when the sleeve is in the extended mode relative to the assembly seen in FIGS. 9 and 10. Sleeve 90 couples to the handle assembly 56 the sleeve and drill 50 are in a retraced mode seen in FIGS. 1 to 3. The manner in which the handle assembly and sleeve connect and interengage is described in more detail, for example, in U.S. Pat. No. 6,601,483 to Wannop, the disclosure of which is incorporated herein by reference, and thus will not be described in further detail. As seen in FIG. 3, inner sleeve 90 has an open rearward end 92 received by tube 58 and an open forward end 94 which is extendable outwards from tube 58 as seen in FIG. 10. Forward end 94 of the sleeve is positioned adjacent to the forward end 52 of the drill 50.

As seen in FIG. 5, a plurality of longitudinally-extending, circumferentially spaced-apart ridges 96 and grooves 98 are alternately interleaved on the exterior 100 of inner sleeve 90. Ridges 96 of sleeve 90 are sized and shaped for smooth slidable longitudinal movement along grooves 82 of tube 58 seen in FIG. 4. The sleeve includes adjacent to its forward end 94 a bit storage region 95, seen in FIG. 3. As seen in FIG. 4, the bit storage region comprises a plurality of circumferentially spaced-apart and longitudinally-extending recesses 97 shaped to receive bits, such as bit 103 seen in FIG. 3. The bit storage region of the sleeve 90 includes a plurality of circumferentially spaced-apart and longitudinally-extending protrusions 99 interleaved therebetween as seen in FIG. 4 at the interior 101 of the sleeve. The protrusions are triangular in cross-section in this example.

A plurality of preferably hexagonally cross-sectioned tool bits 103 are provided within the forward portion of inner sleeve 90, as seen in FIG. 3. The bits may be drill and/or screw bits, and in this example they are in the form of drill bits. Accordingly, inner sleeve 90 may be said to constitute a bit storage member and may also be referred to as a means for storing a plurality of bits including a drill bit and a screwdriver bit. As shown in FIG. 16, each bit 103 includes a proximal end 105 for coupling with and being received by the drill 50 and a distal end 107, seen in FIG. 15, spaced-apart from the proximal end. The distal end of the bit may abut the object to be drilled. Each bit 103 includes a recessed portion, in this example an annular groove 109, seen in FIG. 16, positioned adjacent to its proximal end 105 in this example.

As seen in FIG. 3, drill 50 includes a centrally disposed pushrod 102 having a rearward end 104 coupled to portions 87 of tube 58 adjacent to bore 86. Pushrod 102 extends longitudinally and coaxially through coaxially aligned handle assembly 56 and sleeve 90. As best seen in FIG. 16, the pushrod 102 includes a cylindrical cavity 106 at its forward end 108 within which a pushrod magnet 110 may be coupled via glue or press-fitting for example. Alternatively, the pushrod may have some other means for magnetically attracting on a forward end of the pushrod. The pushrod 102 has a radially inwardly extending recess, in this example an annular groove 112, adjacent to its forward end 108.

As seen in FIG. 3, drill 50 includes a longitudinally-extending inner selector core 114 coupled to portions 113 of tube 58 adjacent to bore 88 and end 54 of the drill. The core is received within sleeve 90, and extendable and retractable with sleeve, with the sleeve being rotatable relative to the core and handle assembly 56 when the drill is in its extended, unlocked mode. A magnetic, bit-changing lever arm 116 is pivotally coupled to selector core 114 and spring-biased to move inwardly. The general functioning and relationship between core 114, sleeve 90, bits, and handle assembly 56 for storing and selecting bits is described in greater detail in U.S. Pat. No. 6,601,483.

To select a bit 103 and referring to FIG. 3, sleeve 90 is pulled outwards relative to handle assembly 56, moving the drill 50 from a retracted position seen in FIGS. 1 to 3 to an extended position seen in FIGS. 9 and 10. Sleeve 90 may then be rotated relative to core 114 and handle assembly 56 until the desired bit aligns opposite lever arm 116 seen in FIG. 9, with a longitudinally-extending slot 121 enabling communication between the lever arm and the bit to be selected. The align of the arm coincides with the alignment with the pointed end 69 of anti-roll projection 68 with the bit to be selected, as seen with reference to FIGS. 8 and 9. Lever arm 116 extends through the slot and selectively retrieves bit 103 via a magnet 115. Handle assembly 56 and sleeve 90 are then pushed together, causing pushrod 102 to actuate arm 116 radially outwards and bit 103 towards magnet 110 of the pushrod. With the bit so connected to the pushrod as seen in FIG. 10, sleeve 90 fully retracts within handle assembly and the bit extends outwards from the forward end 52 of the drill 50 as seen in FIG. 15. The pushrod, lever arm and telescoping tubes may be referred to as a means for retrieving one of the bits for use with the bit tool.

Bit selector mechanisms per se, including their various parts and functionings, are well known to those skilled in the art, as for example disclosed in U.S. Pat. No. 6,601,483 to Wannop, the disclosure of which is incorporated herein by reference. The functionings and parts related thereto will therefore not be described in further detail.

Figure 11:
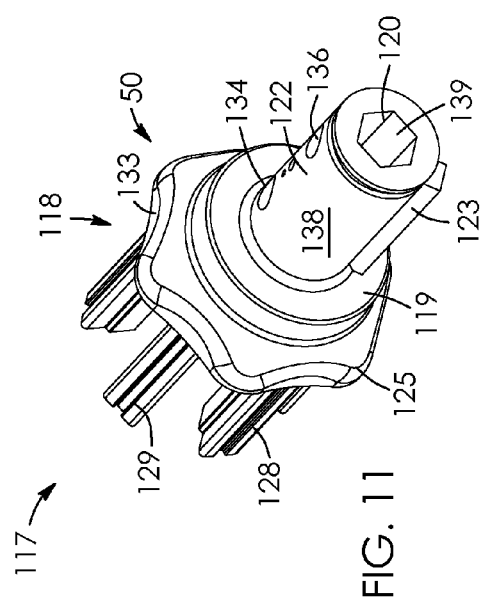
FIG. 11 is a front perspective view of a nose insert for the hand drill of FIG. 1.
Figure 13:
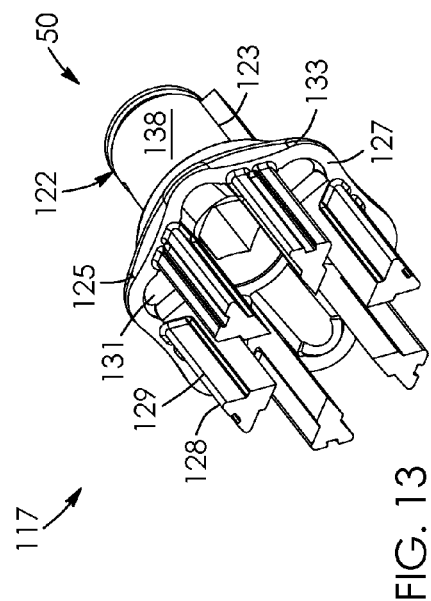
FIG. 13 is a rear perspective view thereof.

Drill 50 includes a locking assembly 117 as seen in FIG. 1 adjacent to front end 52 of the drill. In this example, the locking assembly includes nose insert 118, best seen in FIGS. 11 to 14, connected to and partially disposed within end 94 of sleeve 90, as seen in FIG. 2. The insert may be said to be a part or component of sleeve 90 and is made of a durable material such as metal in this example. As seen in FIG. 11, the insert 118 has a central bore 120 extending therethrough which is hexagonal in cross-section in this example for slidably receiving bits therethrough.

The insert includes a front portion or inner tube 122 having an outwardly-facing, longitudinally-extending annular exterior 138 and an inwardly facing, longitudinally-extending annular interior 139. The tube includes a longitudinally-extending elongate protrusion 123 extending radially outwards from the exterior 138 of the inner tube 122. The insert 118 has a forwardly-tapered, partially conical middle portion 125 coupled to tube 122. The middle portion 125 has a rearward facing end 127 and is hollow at said end. The periphery 133 of the middle portion of the insert 118 is hexagonal-shaped at end 127 of the middle portion in this example.

The insert has a rear portion 128 comprising a plurality of circumferentially spaced-apart and longitudinally-extending bit separators or protrusions 129 which extend from rearward facing end 127 of middle portion 125. Bits 103 seen in FIG. 3 are interposable between respective ones of the protrusions 129. Middle portion 125 has a plurality of circumferentially spaced-apart, inner channels 131 seen in FIG. 13 that inwardly taper as they extend from end 127 towards the front end of the drill. The channels may facilitate movement of bits towards the front end of the drill when a given bit is selected for use. The insert 118 includes an annular shoulder 119 interposed between its middle portion 125 and tube 122. Middle portion 125 and shoulder 119 may be referred to as a housing.

Tube 122 of the insert 118 has a pair of spaced-apart apertures 134 and 136 transversely extending therethrough from exterior 138 of the insert of the tube to bore 120. The apertures extend radially from exterior 138 to interior 139 and are longitudinally spaced-apart from each other. Aperture 134 is positioned to align with annular groove 112 of the pushrod 102, seen in FIG. 16, when the pushrod and drill 50 are in the retracted mode seen in FIGS. 1 to 3 and 15 to 18. Aperture 136 is positioned to align with annular groove 109 of the bit 103 when the bit connects to the pushrod and the drill is in the retracted mode.

As seen in FIG. 18, the locking assembly 117 includes a pair of locking members, in this example metal balls 130 and 132 shaped and positioned to slidably fit within respective ones of the apertures 134 and 136 of insert 118. The balls are also shaped to at least partially fit within grooves 112 and 109.

Insert 118 includes an annular groove 140 that extends radially inwards of tube 122 from exterior 128 of the tube adjacent to the front end 52 of the drill 50. Groove 140 receives a retaining member, in this example a circlip 142.

As seen in FIG. 18, tube 122 has an inwardly-extending recess 144 which extends inwardly from exterior 128. Recess 144 is positioned between apertures 134 and 136 in this example.

Referring to FIG. 1, the locking assembly 117 includes a collar 146 which is generally tubular in shape and which extends around and slidably connects to tube 122 of insert 117 via protrusion 123 seen in FIG. 11 and a corresponding elongate groove 141 in the collar, seen in FIG. 2, shaped to receive said key. Referring to FIG. 3, the collar has an annular proximal end 148 adjacent to, facing and selectively abutting shoulder 119. The collar 146 has an annular distal end 150 spaced-apart from the proximal end.

As seen in FIG. 16, collar 146 has a central bore 152 extending therethrough and through which tube 122 at least partially extends and is received. The collar has an annular inner surface 154 which may slidably engage with exterior 138 of tube 122. Collar 146 has a radially inwardly extending lip 156 adjacent to end 52 of the drill 50. Lip 156 is shaped to extend within a distal groove 158 of tube 122. When groove 158 so receives lip 156, the lip also engages with circlip 142, which may function to hold collar 146 in place relative to tube 122 when in the locked mode shown in FIG. 18.

As seen in FIG. 16, collar 146 includes a pair of outwardly-extending recesses 160 and 162 which face tube 122 and which extend radially outwards from inner surface 154 of the collar. Recess 160 is positioned adjacent to shoulder 119 and recess 162 is positioned adjacent to end 52 of the drill 50 in this example. Recesses 160 and 162 are shaped so as to be capable of at least partially receiving balls 130 and 132.

The locking assembly 117 includes a ball plunger 164 comprising a ball 166 radially inwardly biased against exterior 138 of tube 122. The ball is at least partially positioned within a radially extending aperture 170 of the collar 146. The ball 166 is spring-biased via a coil spring 168 towards exterior 138 of tube 122. Ball 166 is configured to selectively partially fit within recess 144 of tube 122 when the locking assembly 117 and drill 50 are in the unlocked mode seen in FIGS. 15 and 16.

The collar 146 is moveable from the unlocked position or mode shown in FIGS. 15 and 16 to a locked position seen in FIGS. 17 and 18 for selectively biasing balls 130 and 132 radially inwards to abut grooves 109 and 112 of bit 103 and pushrod 102, respectively. The locking assembly 117 thus functions to selectively couple the bit and the pushrod together thereby. Annular inner surface 154 of collar 146 abuts balls 130 and 132 to couple the bit 103 and pushrod 102 together in the locked mode. In the locked position or mode seen in FIGS. 17 and 18, end 148 of collar 146 abuts shoulder 119 and ball 166 of plunger 164 is dislodged from and longitudinally spaced-apart from recess 144 of tube 122. The collar thus biases the balls towards the bit and the pushrod, respectively, in the locked position. The locking assembly 117 may be referred to as a means for securing the bit in place, with core 114 in this mode connecting to a bit to be driven.

The collar 146 may be selectively pulled axially outwards relative to shoulder 119 to move the locking assembly 117 from the locked mode to an unlocked mode. When the collar 146 is so pulled, ball-plunger 164 engages with recess 144 of tube 122, balls 130 and 132 are radially moveable outwards to at least partially be received by recesses 160 and 162 of the collar. The balls are radially extendable outwards to enable the pushrod 102 to freely move and retract the bit 103 within the tube 122 when said recesses of the collar align with the apertures 134 and 136 of the tube 122. In the unlocked mode seen in FIGS. 15 and 16, the locking assembly 117 enables other bits to thus then be selectively chosen.

FIGS. 19 to 24 show a bit tool, in this example a screwdriver 50.1 according to a second aspect. Like parts have like numbers and functions as the hand drill shown in FIGS. 1 to 18 with the addition of ".1". Screwdriver 50.1 is substantially the same as the hand drill 50 shown in FIGS. 1 to 18 with at least the following exceptions.

Figure 19:
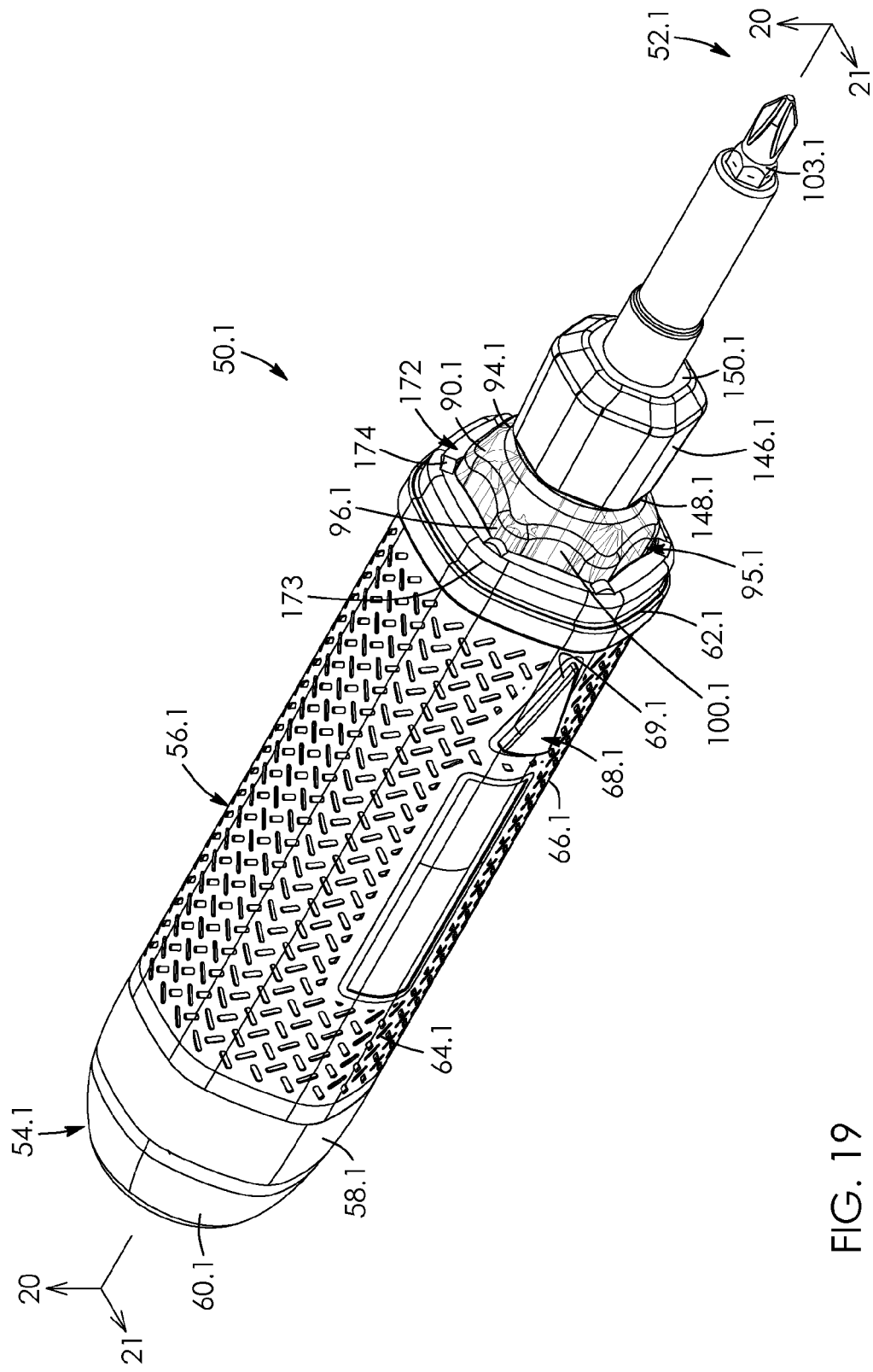
FIG. 19 is a front perspective view of a bit tool according to a second aspect, in this example in the form of a screwdriver, the screwdriver being shown in a retracted mode.

Bits 103.1 in this case are in the form of a plurality of screwdriver bits instead of drill bits. As seen in FIG. 19, sleeve 90.1 is at least partially transparent.

Screwdriver 50.1 includes a light assembly 172 comprising a plurality of circumferentially spaced-apart, forward-facing lights 174 shaped to extend around the sleeve for selectively illuminating the sleeve to reveal the bits. The lights are positioned around the exterior 100.1 of sleeve 90.1. The lights 174 are LED lights in this example. Each of the lights aligns with a respective one of the ridges 96.1 of sleeve 90.1.

Figure 23:
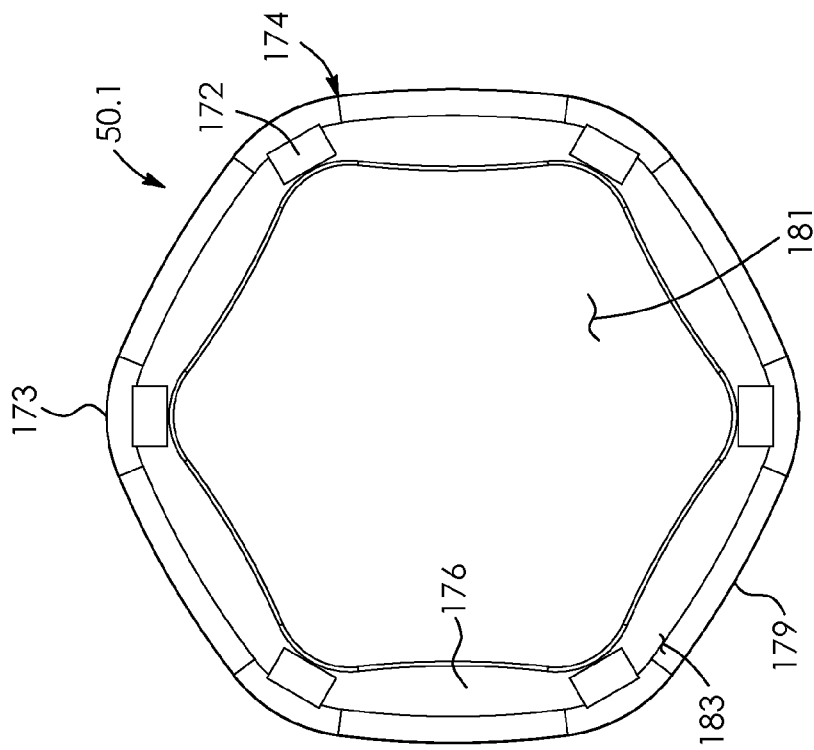
FIG. 23 is a front elevation view thereof.
Figure 22:
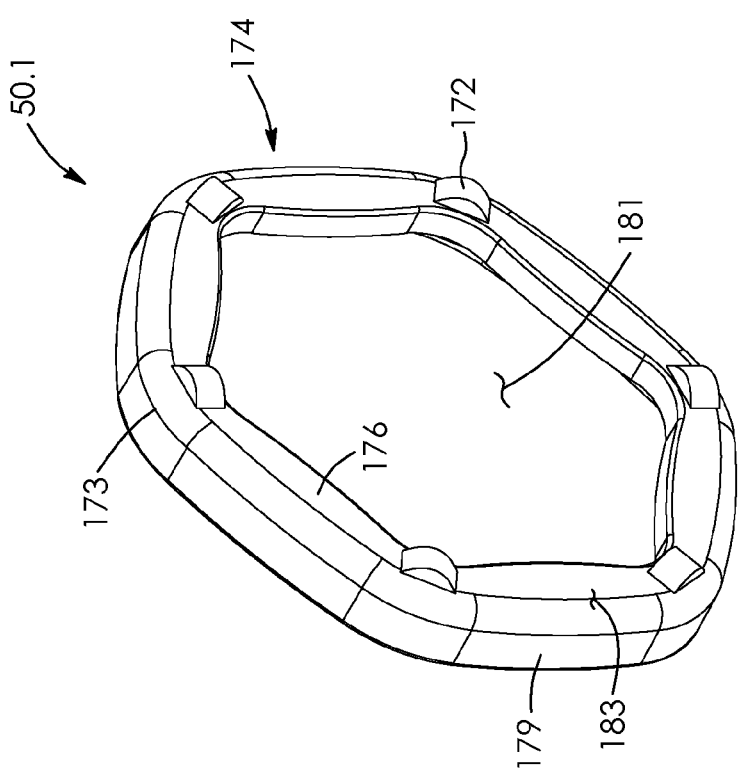
FIG. 22 is a front perspective view of a light assembly of the screwdriver of FIG. 19.
Figure 24:
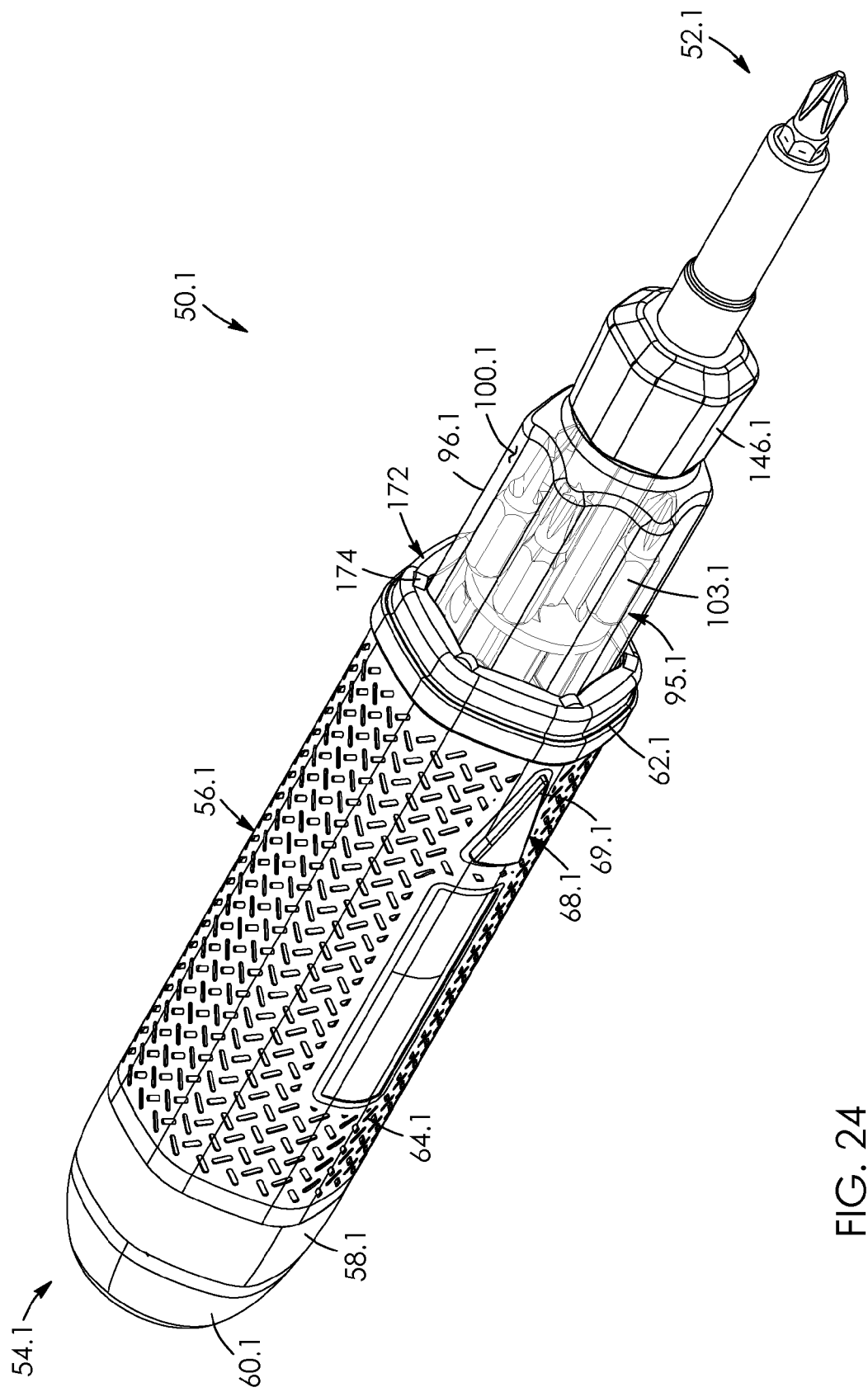
FIG. 24 is a perspective view of the screwdriver of FIG. 19, the screwdriver being shown in an extended mode.

The light assembly 172 includes a plurality of circumferentially spaced-apart protruding portions 173. The lights 174 align with respective ones of the protruding portions of the light assembly. As seen in FIG. 20, lights 174 abut end 62.1 of tube 58.1 in this example. As seen in FIGS. 22 and 23, the light assembly 172 includes a lens 176 shaped to extend around sleeve 90.1. In this example, the light assembly and lens are generally hexagonal in shape, with the lens having a hexagonal-shaped outwardly-facing peripheral portion 179. The lens 176 includes and surrounds a hexagonal-shaped aperture 181, and a forward-facing portion 183 extending between portion 179 and aperture 181.

As seen in FIGS. 20 and 21, the light assembly 172 includes a power source, in this example a battery 178 positioned by rear end 54.1 of the screwdriver 50.1. The battery is electrically coupled to the light assembly for selectively illuminating sleeve 90.1

FIGS. 25 to 32 show a bit tool, in this example a power tool 50.2 according to a third aspect. Like parts have like numbers and functions as the hand drill 50 shown in FIGS. 1 to 18 with the addition of ".2". Tool 50.2 also includes a light assembly 172.2 substantially similar to light assembly 172 seen in FIGS. 19 to 24. Otherwise, power tool 50.2 is similar to hand drill 50 shown in FIGS. 1 to 18 with at least the following exceptions.

Figure 25:
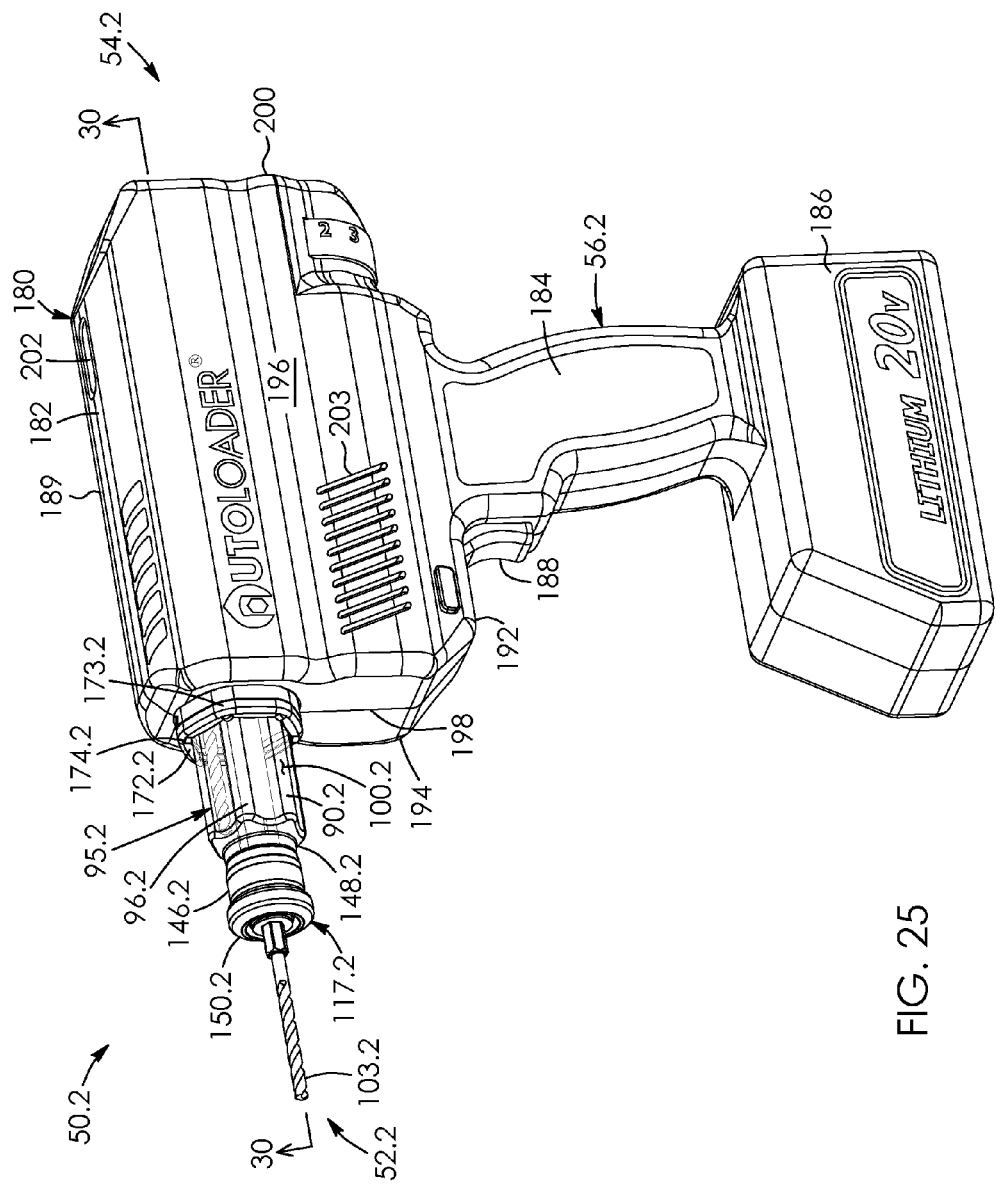
FIG. 25 is a front perspective view of a bit tool according to a third aspect, in this example in the form of a power tool, the power tool being shown in a retracted, locked mode.
Figure 26:
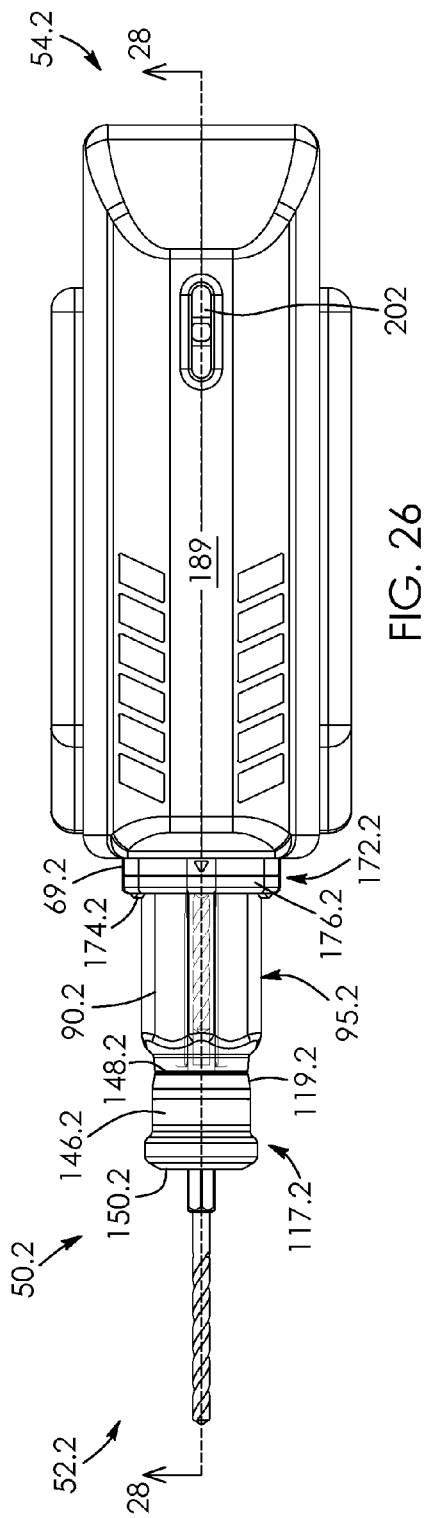
FIG. 26 is a top plan view thereof.
Figure 27:
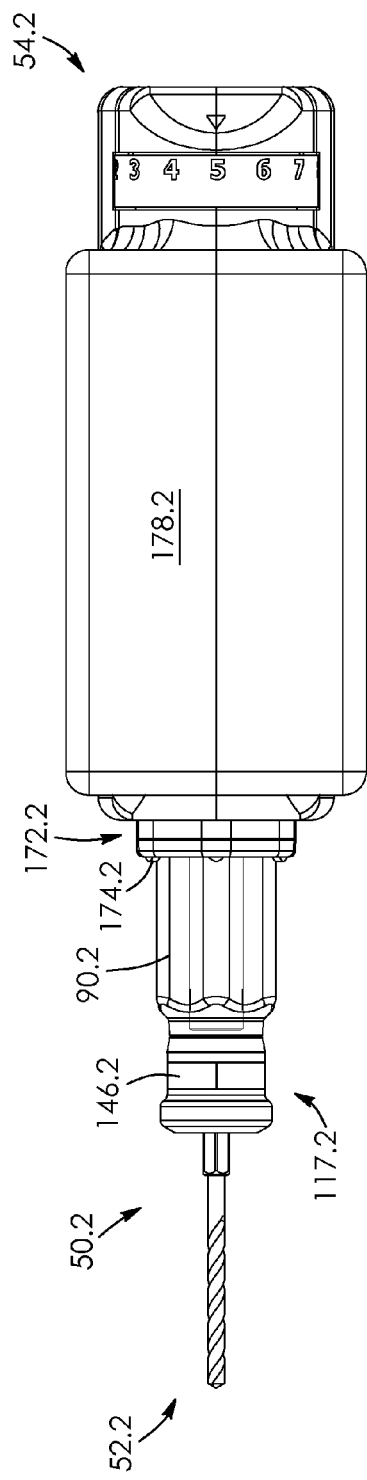
FIG. 27 is a bottom plan view thereof.
Figure 28:
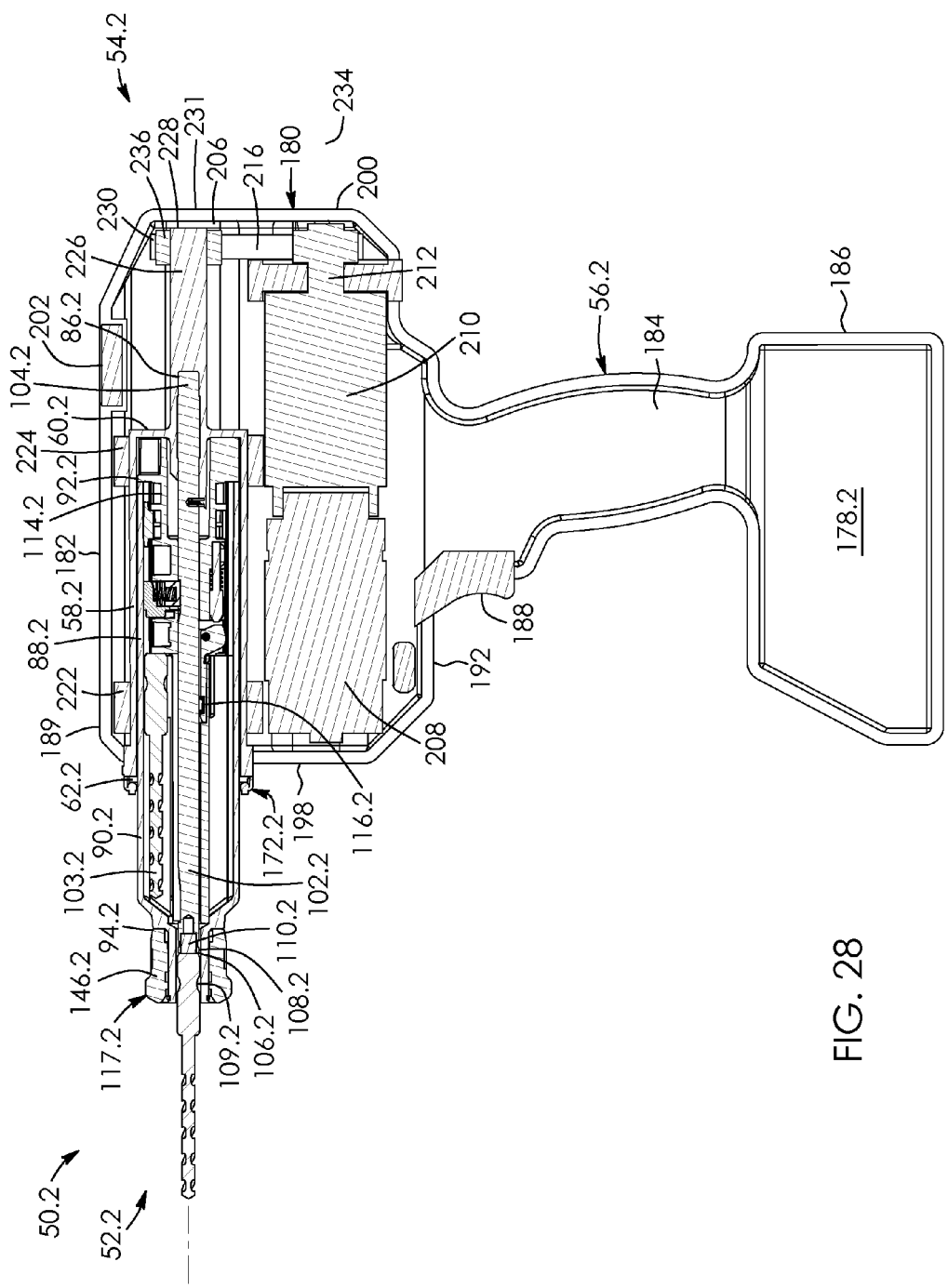
FIG. 28 is a sectional view thereof taken along lines 28-28 of the power tool shown in FIG. 26.

As seen in FIG. 25, the power tool has a housing 180, which includes a top portion 182, an elongate handle portion 184 for gripping and actuating the tool, which extends downwards from the top portion, and a battery storage portion 186 for storing battery 178.2 seen in FIG. 28. The handle portion of the housing connects the top portion and battery portions together. Handle portion 184 includes a trigger 188 that may be actuated within a user's index finger. Top portion 182 is generally in the shape of a rectangular prism in this example. It has a top 189, a bottom 192, a pair of spaced-apart sides 194 and 196, a front 198 and a rear 200 opposite the front. Sides 194 and 196 extend between the front and rear of the top portion of the housing. Front 198 and rear 200 extend from top 189 to bottom 192 of portion 182 of the housing 180.

The power tool 50.2 includes a level 202 mounted on the top of the housing in this example. The level axially aligns with bit 103.2 and enables the operator to determine when the bit is level. The housing 180 has a plurality of cooling slots 203 extending through each of sides 194 and 196 for cooling the interior 206 of the top portion of the housing seen in FIG. 28.

Referring still to FIG. 28, the power tool 50.2 includes an electric motor 208 between the sides of the top portion of the housing and positioned within the top portion of the housing adjacent to the front 198 and bottom 192 thereof. Slots 203, seen in FIG. 25, are positioned to selectively cool the motor. Referring back to FIG. 28, the motor 208 is electrically coupled to and powered by battery 178.2 in this example via wiring (not shown) and is operatively connected to the trigger 188 for selectively actuating the motor thereby.

The power tool 50.2 includes a clutch assembly 210 between the sides 196 and 198 of the top portion 182 of the housing 180 seen in FIG. 25. The clutch assembly is positioned within the top portion of the housing adjacent to the rear 200 and bottom 192 thereof in this example. Referring to FIG. 28, motor 208 is coupled to the clutch assembly. The clutch assembly 210 is coupled to a drive shaft 212. The power tool 50.2 includes an adjustment mechanism 214, best seen in FIG. 29, coupled to the clutch assembly for selectively adjusting the speed at which the motor operatively rotates shaft 212.

Trigger 188 shown in FIG. 28 is a switch operatively connected to the motor 208 for selectively rotating tube 58.2 and sleeve 90.2. Motors, clutch assemblies and adjustment mechanisms therefor per se, including their various parts and functionings, are well known to those skilled in the art and therefore will not be described in detail.

Figure 29:
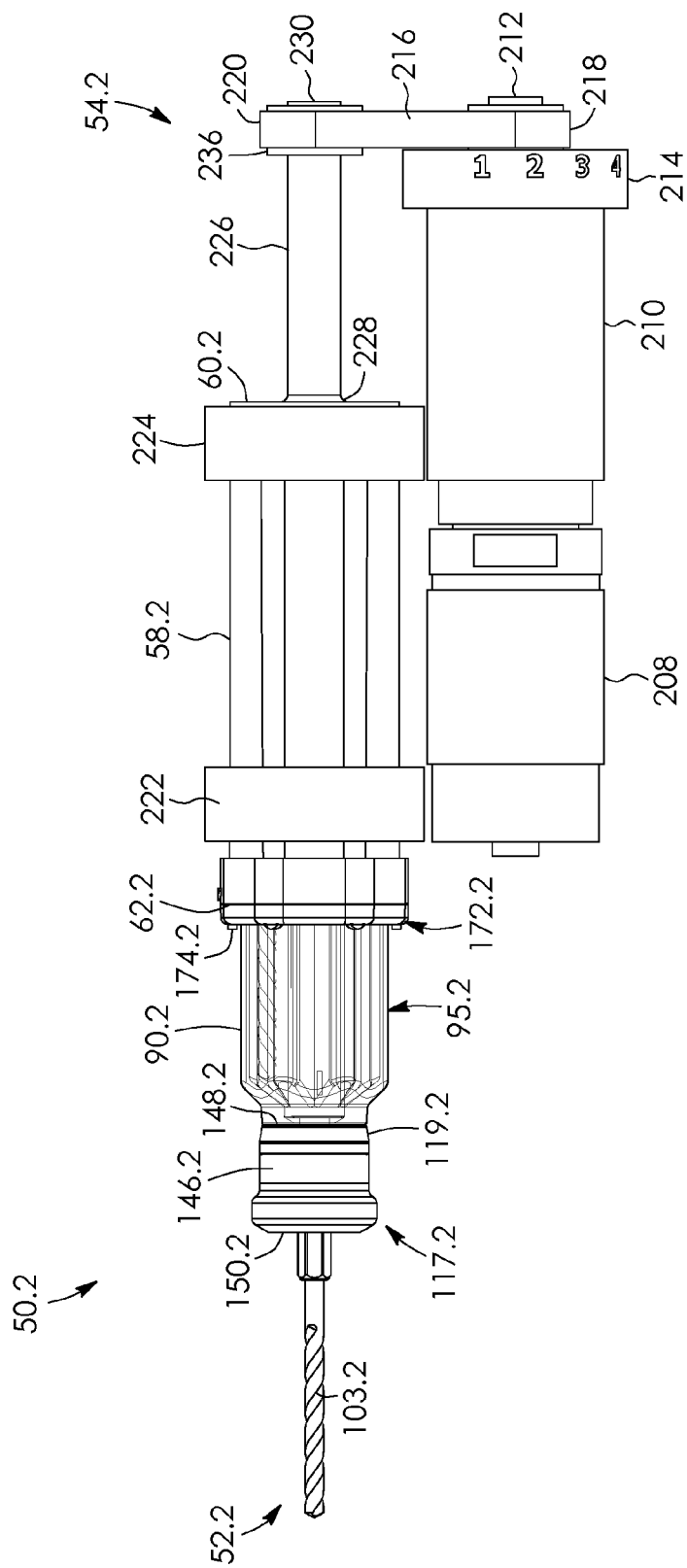
FIG. 29 is a side elevation view of the power tool of FIG. 25 with the housing of the power tool being removed to show various parts of the power tool positioned within the housing, including a motor and clutch assembly.
Figure 32:
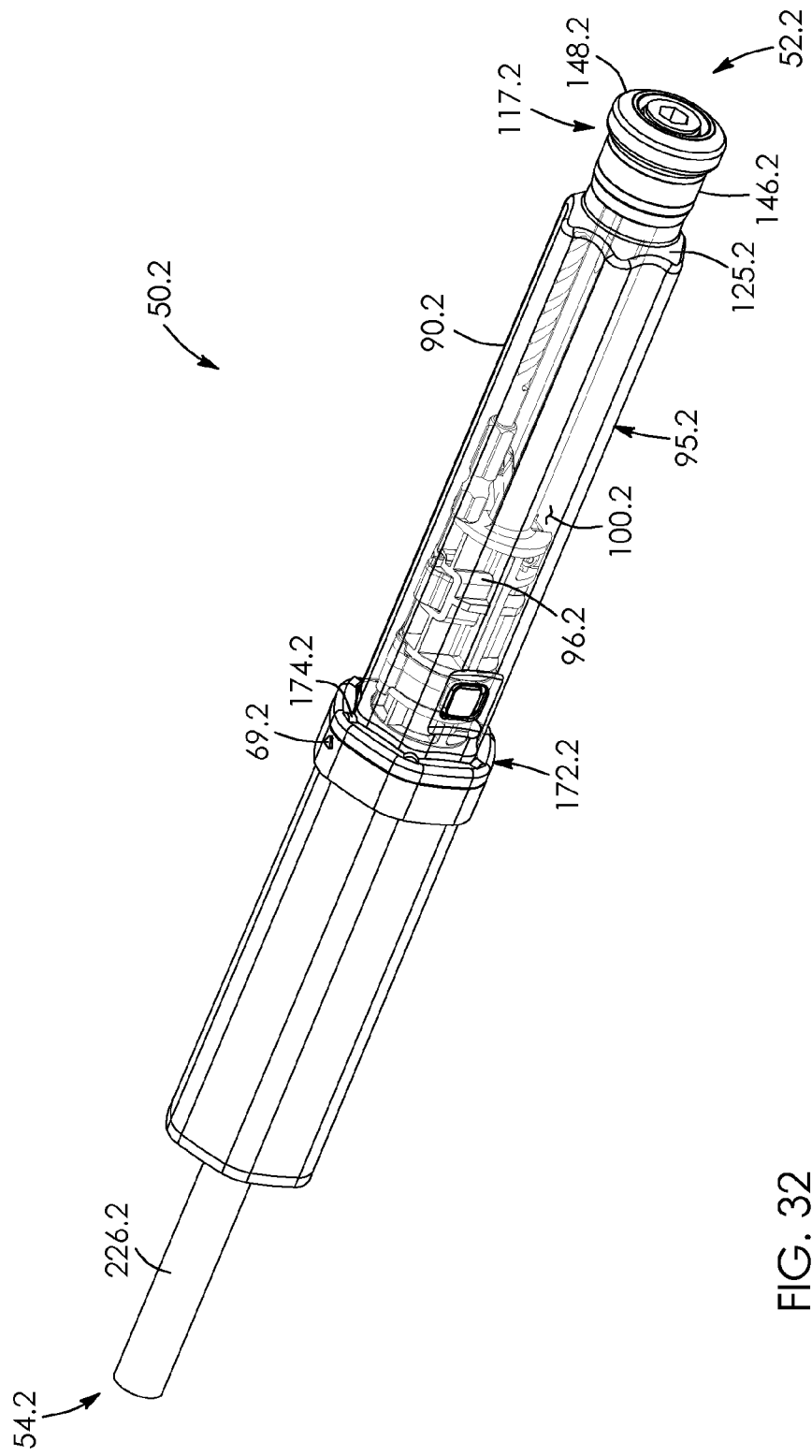
FIG. 32 is a front perspective view of the removable portion similar of the power tool of FIG. 28, the removable portion of the power tool being in an extended, locked mode.

The power tool 50.2 includes a coupling member, in this example a continuous drive belt 216, best seen FIG. 29, which has a first looped end 218 that extends around shaft 212 and a second loop end 220 spaced-apart from the first looped end.

Tube 58.2 is positioned within top portion 182 of housing 180, seen in FIG. 28, adjacent to top 189 thereof, with end 62.2 being positioned adjacent to front 198 of the housing 180. The power tool 50.2 includes a pair of spaced-apart bearings 222 and 224 coupled to the top portion 182 of the housing 180 and located therein. Tube 58.2 is rotatably mounted within the housing 180 in this example via the bearings, with bearing 222 rotatably supporting the sleeve adjacent to end 62.2 thereof and bearing 224 rotatably supporting the tube at end 60.2 thereof. End 60.2 of tube 58.2 is positioned within the housing 180 between front 198 and rear 200 of the top portion 182 as seen in FIG. 28.

Tube 58.2 includes a transmitting shaft 226 with a first end 228 connected to and integral with end 62.2 of the tube and a second end 230 positioned adjacent to rear 200 of the top portion 182 of the housing 180. As seen in FIG. 28, sleeve 90.2, tube 58.2 and shaft 226 share a common central axis 231 that is spaced-apart from and in parallel with axis 234 of drive shaft 212. The power tool 50.2 includes a connector, in this example a pulley 236 coupled to end 230 of the shaft 226. End 220 of belt 216 extends around pulley 236, with drive shaft 212 thus coupling with shaft 226.

Shaft 226.2, tube 58.2 and the various parts therewithin, as seen in FIGS. 30 and 31, may be referred to a removable portion of the power tool 50.2. The removable portion of the power tool may connected to an off-the-shelf power tool via shaft 226.2 and a convention chuck assembly gripping said shaft, for example.

Figure 33:
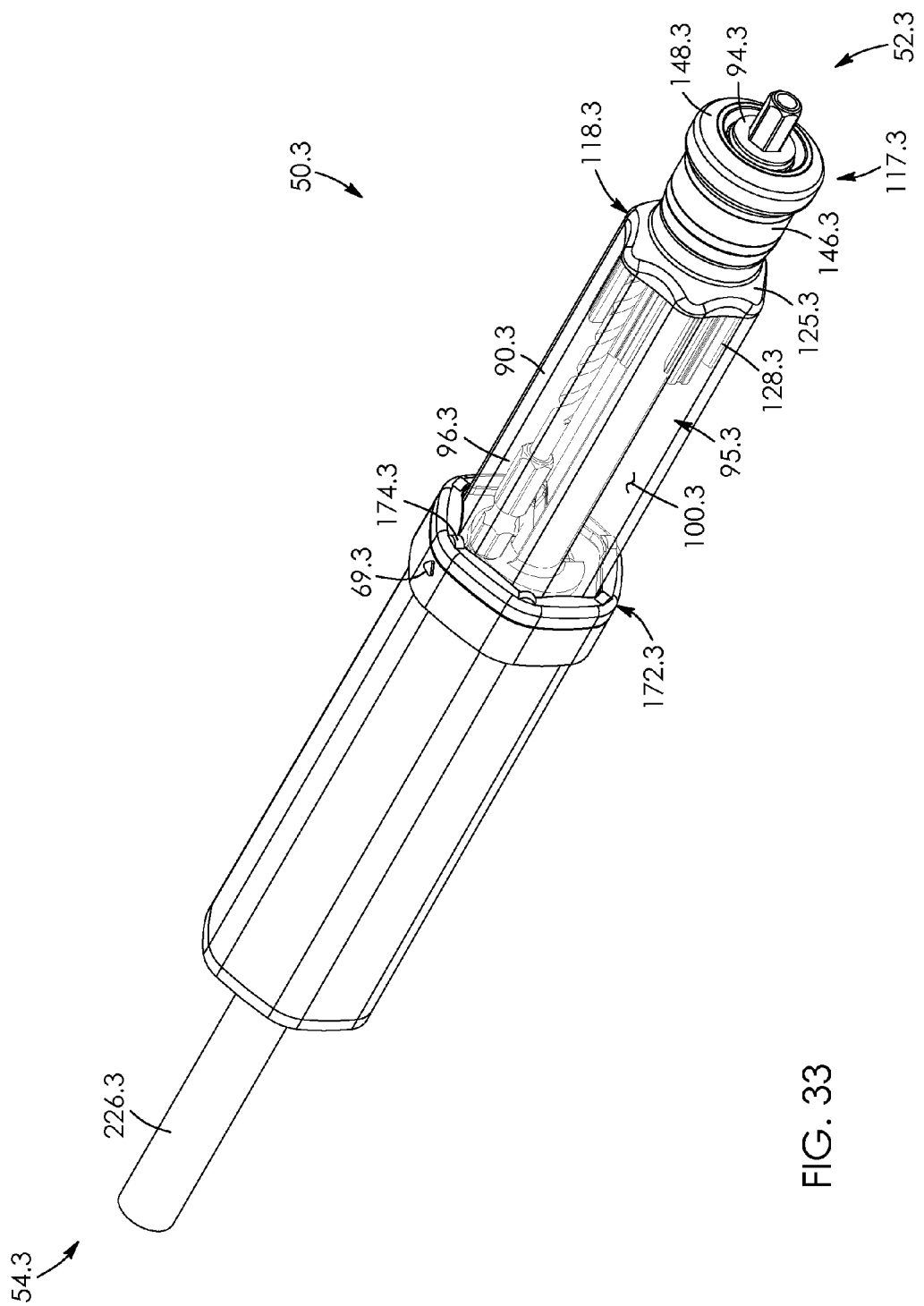
FIG. 33 is a front perspective view of a removable portion similar to FIG. 30 for a bit tool, in this example a power tool according to a fourth aspect, the removable portion of the power tool being in a partially extended, unlocked mode.
Figure 34:
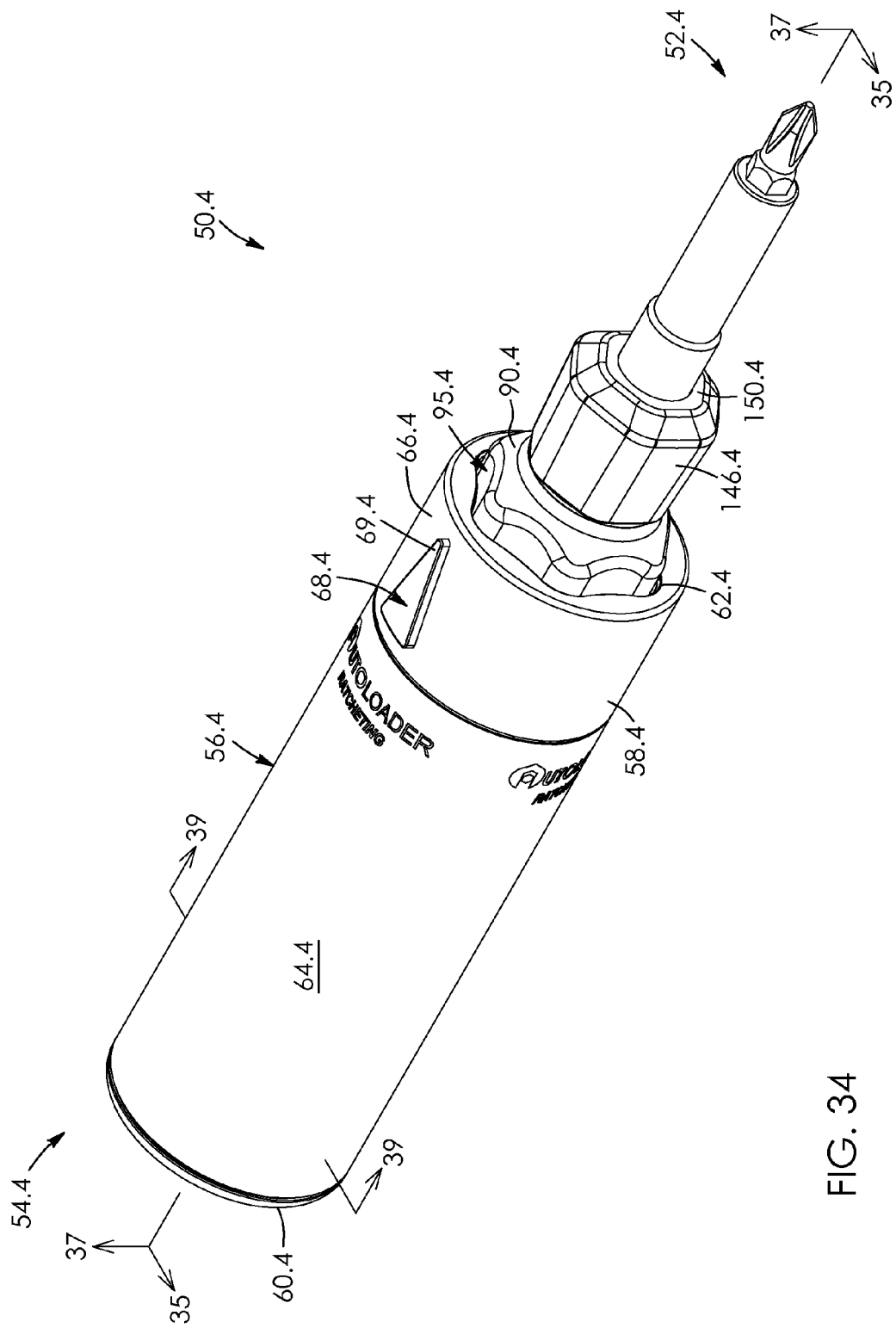
FIG. 34 is a front perspective view of a bit tool according to a fifth aspect, in this example in the form of another screwdriver.
Figure 39:
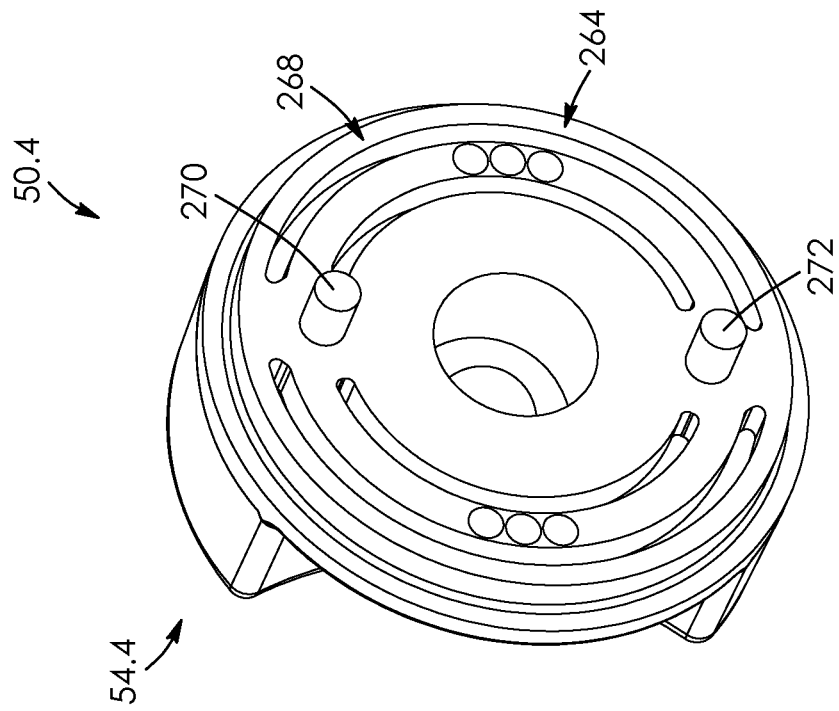
FIG. 39 is a front perspective view thereof.
Figure 38:
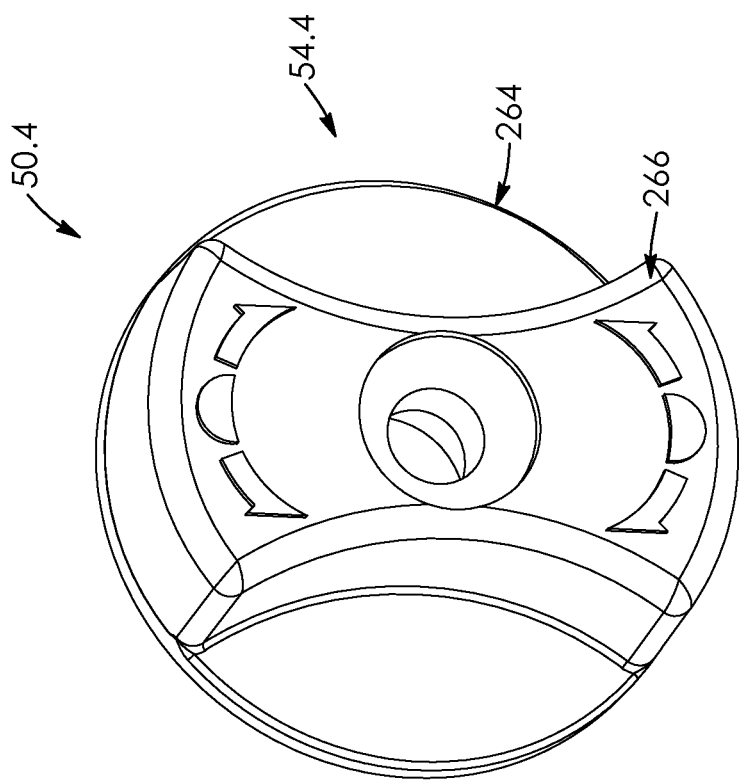
FIG. 38 is a rear perspective view of a selector member of the screwdriver of FIG. 34.

FIG. 33 shows a removable portion of a power tool 50.3 according to a fourth aspect. Like parts have like numbers and functions as tool 50.2 shown in FIGS. 25 to 32 with the addition of ".3". Tool 50.3 is substantially similar to tool 50.2 with the exception that it further includes a nose insert 118.3 substantially similar to nose insert 118 described for hand drill 50 in FIGS. 1 to 18. The tool is shown between retracted and extended modes.

FIGS. 34 to 47 show a bit tool, in this example a screwdriver 50.4 according to a fifth aspect. Like parts have like numbers and functions as the hand drill 50 shown in FIGS. 1 to 18 with the addition of ".4".

As seen in FIG. 35, gripping member 64.4 slidably engages with tube 58.4 at a forward end 238 of the member. As best seen in FIG. 40, handle assembly 56.4 includes a ring gear 240 positioned within interior 76.4 of the gripping member. The ring gear is coupled to the handle assembly via a plurality of circumferentially spaced-apart, longitudinally-extending outwardly extending recesses 242 of the gripping member 64.4 snugly receive corresponding outwardly extending protrusions 244 of the ring gear 240 in this example. The ring gear has a central bore 241 extending therethrough and a plurality of circumferentially spaced-apart gear teeth 245 facing bore 241 and core 114.4, as seen in FIG. 40. Referring to FIG. 35, the ring gear has a front face 249 which faces rearward facing annular end 250 of core 114.4.

As seen in FIG. 40, inner core 114.4 has a pair of elongate, transversely extending apertures, in this example channels 246 and 248 adjacent to the rearwardly facing end 250 of the core seen in FIG. 35.

Referring back to FIG. 40, the screwdriver 50.4 includes a pair of catch members 252 and 254 operatively connected to and spring-biased to move linearly outwards relative to the core 114.4. In this case, the catch members are disposed within channels 246 and 248. As seen in FIG. 41, each catch member is generally in the shape of a rectangular prism in this example. Each catch member 254 has a first end 256, which is flat in this example and positioned within its channel. Each catch member has a second end 258 spaced-apart from its first end. Each of the second ends of the catch members is arcuate-shaped and has at least one tooth, in this example two teeth 260 shaped to engage with selective ones of the gear teeth 245 of the ring gear 240. As seen in FIG. 40, inner core 114.4 has a longitudinal axis 261 and the catch members 252 and 254 are radially spaced-apart from said axis. The catch members are aligned on respective sides relative to the axis and align in parallel with each other in this example.

As seen in FIG. 40, each catch member is spring-biased in a radially outwards direction towards teeth 245 via springs 259 which abut a portion 267 of the core 114.4 in communication with its channel 246, said portion facing outwards and facing the channel. The catch members 252 and 254 are operatively connected to and linearly moveable relative to and transverse to the inner core 114.4 via channels 246 and 248. Each catch member includes a linearly-extending slot 262 extending at least partially therethrough. Each slot is generally oval-shaped in profile in this example and has a width $W_s$. The slots 262 are positioned between ends 256 and 258 of the catch members 252 and 254 and extend in parallel with channels 246 and 248 in this example. Each slot 262 has a first end 275 adjacent to spring 259 and a second end 277 spaced-apart from the first end portion, with the catch members having portions 279 and 281 adjacent to said ends, respectively.

As seen in FIGS. 35 and 40, screwdriver 50.4 includes a knob 263 that is cylindrical and partially hollow in shape in this example. The knob is positioned within a rearward-facing recess 265 of the core 114.4 by the rear end 54.4 of the drill, as seen in FIG. 36.

The screwdriver 50.4 includes a selector member 264 rotatably connecting to the inner core. The selector member has a rear, handled end 266 seen in FIG. 38 and a forward end 268 seen in FIG. 39. The forward end of the member includes a plurality of circumferentially spaced-apart recesses 271, as seen in FIG. 40. Knob 263 is spring-biased, via spring 273, to abut the selector member 264, with the recesses 271 being shaped to selectively receive the knob.

A pair of protrusions, in this example, circumferentially spaced-apart, longitudinally-extending pins 270 and 272 forwardly extend from the forward end 268 of the selector member and into slots 262 of the catch members 252 and 254 as seen in FIG. 43. The pins are circumferentially spaced-apart by 180 degrees in this example. As seen in FIG. 43, each pin 270 has a diameter $D_p$ which is smaller than the cross-sectional width $W_s$ of the slots 262. Rotation of the selector member 264 selectively actuates the pins 270 and 272 and thus selectively actuates linear positioning of the catch members 252 and 254. The selector member is thus shaped to selectively engage and adjust linear positioning of the catch members 252 and 254.

As seen in FIGS. 35 and 37, screwdriver 50.4 further includes an annular thrust washer 274 longitudinally spaced between the front face 249 of the ring gear 240 and rear end 250 of inner core 114.4. The thrust washer enables the handle assembly 56.4 to slidably abut with end 250 of the inner core when the handle assembly 56.4 is forwardly-rotated against the inner core. The screwdriver 50.4 includes an end cap 276, best seen in FIGS. 35 and 37, threadably connected to tube 58.4 by the rear end 54.4 of the screwdriver 50.4. The end cap biases the ring gear 240 against thrust washer 247, which in turn is biased against end 250 of the inner core 114.4.

The selector member 264 is configured to actuate respective ones of the catch members 252 and 254 for selectively causing the handle assembly 56.4 to ratchetly drive the inner core 114.4 in forward, locked neutral and reverse positions as will be further described below.

As seen in FIGS. 42 and 43, when the selector member is in a forward position, pin 272 engages catch member 254 and biases it inwards and away from teeth 245 of gear ring 240. Pin 270 is freely moveable with the slot of catch member 252, thereby allowing spring 259 to bias the catch member outwards so that teeth 260 of catch member 252 abut against the teeth 245 of the ring gear 240. In this position, handle assembly 56.4 may slidably abut with and biases catch member 252 inwardly when the handle assembly is rotated in a first, forward direction as shown by arrow of numeral 278. The forward direction is a clockwise direction from the perspective of FIG. 43 in this example.

When the handle assembly is rotated in a second, reverse direction, shown by arrow 280, in this example a counter clockwise direction, the teeth 245 of the ring gear promote outwards movement of catch member 252, thereby promoting engagement and jamming of the teeth together. In this manner, rotation of the handle assembly 56.4 is locked or inhibited in the reverse direction in this mode. Thus, when one of the catch members engages the ring gear, handle assembly 56.4 is rotatable in the direction which enables the ring gear to inwardly bias said one of the catch members.

As seen in FIG. 42, the handled end 266 of the selector member 264 has a pair of spaced-apart, arcuate-shaped protrusions 282 and 284 which facilitate rotation of the selector member. As seen in FIG. 35, the selector member is centrally pivotally mounted to pushrod 102.4 via a fastener or pivot pin 286. Pushrod 102.4 is coupled to tube 58.4 via fastener 288. The selector member 264 is thus operatively rotatable coupled to tube 58.4. In this case, protrusion 284 aligns with its engaged, adjacent catch member 254 and towards the teethed-end of the catch member and protrusion 282 is spaced-apart below and away from the teethed-end of its associated catch member 254.

Figure 45:
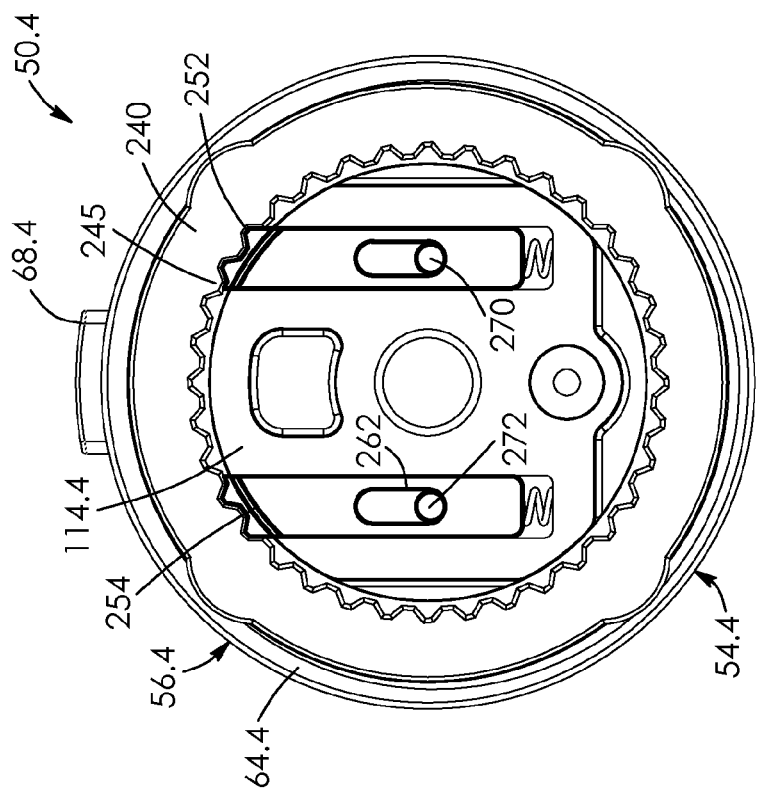
FIG. 45 is a rear elevation view similar to FIG. 43 of the ratchet assembly, the ratchet assembly being show in the locked, neutral position.
Figure 44:
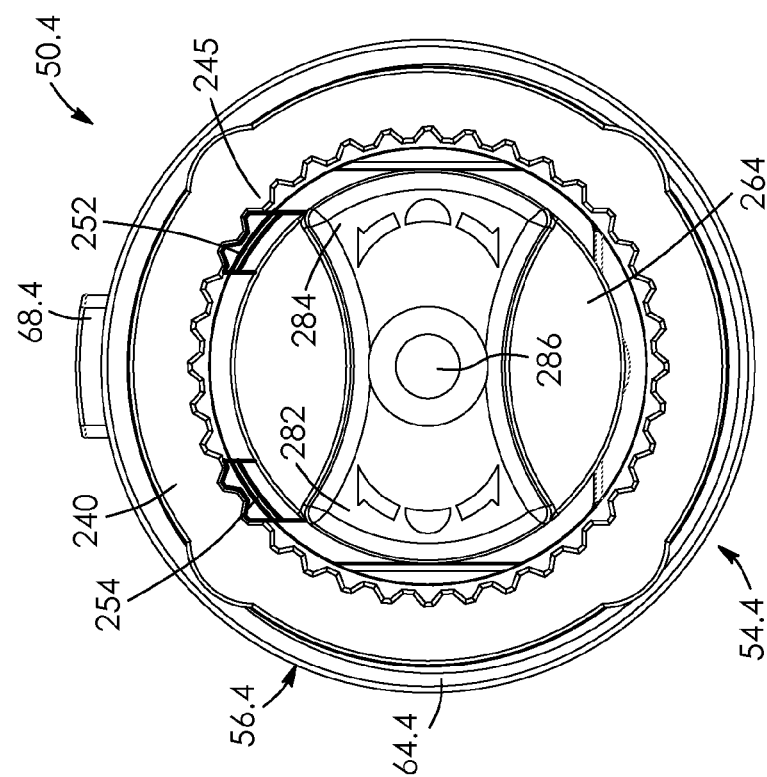
FIG. 44 is a rear elevation view similar to FIG. 42 of the ratchet assembly shown in a locked, neutral position in which both catch members radially extend outwards and engage with the ring gear.

Referring now to FIGS. 44 and 45, selector member 264 may be rotated slightly in the clockwise direction from the perspective of FIG. 44 so that protrusions 282 and 284 align with each other and are approximately perpendicular with each other in this example, so that neither of the catch members 252 and 254 is fully engaged or actuated inwards by the selector member 264 as seen in FIG. 45. This is the locked, neutral position, where the catch members are enabled to both extend outwards and engage with respective ones of the teeth 245 of the ring gear, thereby inhibiting motion in both clockwise and counter-clockwise directions.

Figure 47:
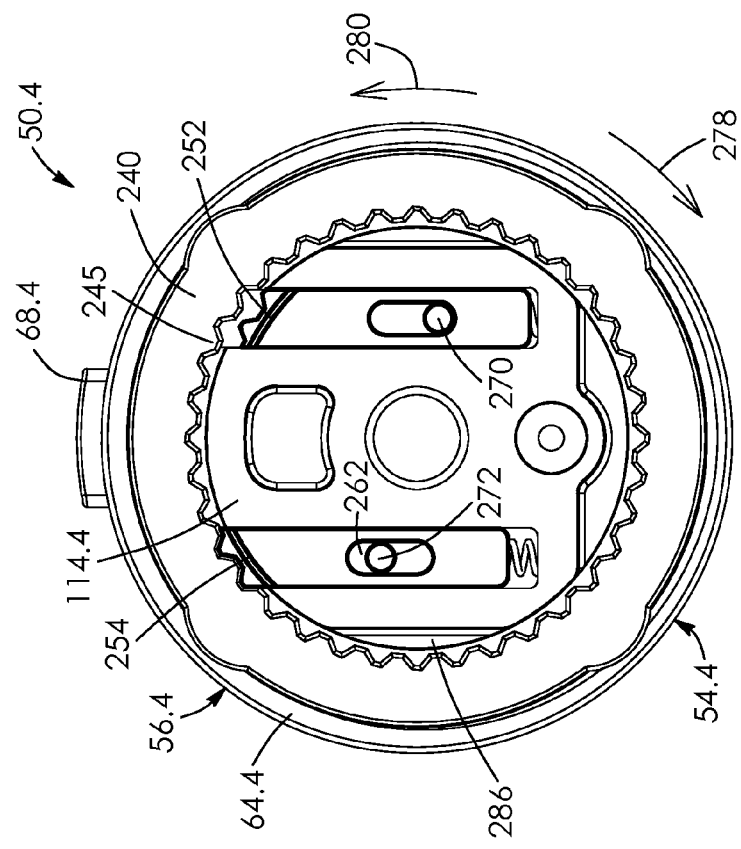
FIG. 47 is a rear elevation view similar to FIG. 45 of the ratchet assembly, the ratchet assembly being show in the reverse position.
Figure 46:
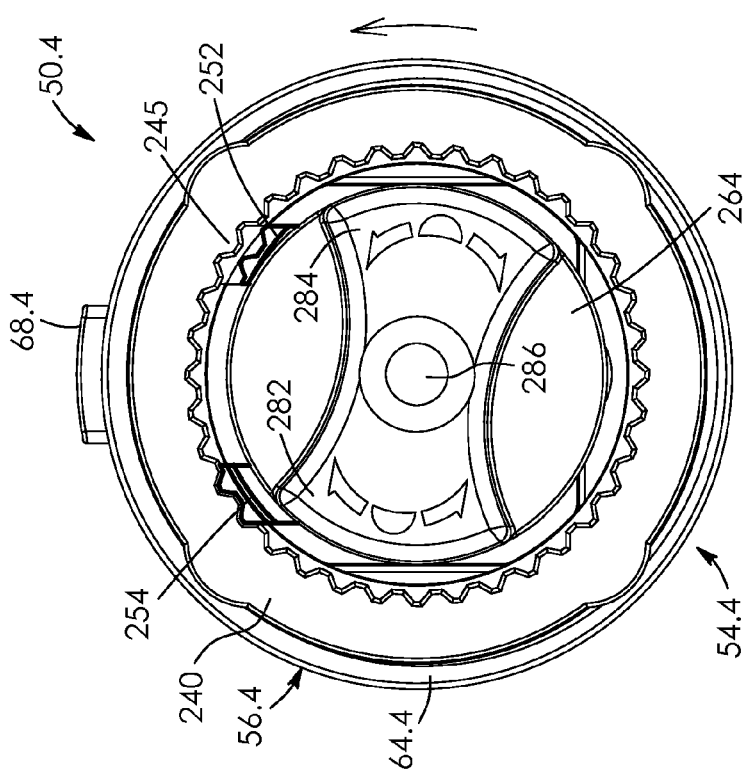
FIG. 46 is a rear elevation view similar to FIG. 44 of the ratchet assembly now in a reverse position to permit counter clockwise rotation from the perspective of FIG. 46, in which the first one of the catch members is actuated inwardly by the selector member to engage with the ring gear, and in which the second of the catch members is radially extended outwards and engages with the ring gear.
Figure 48:
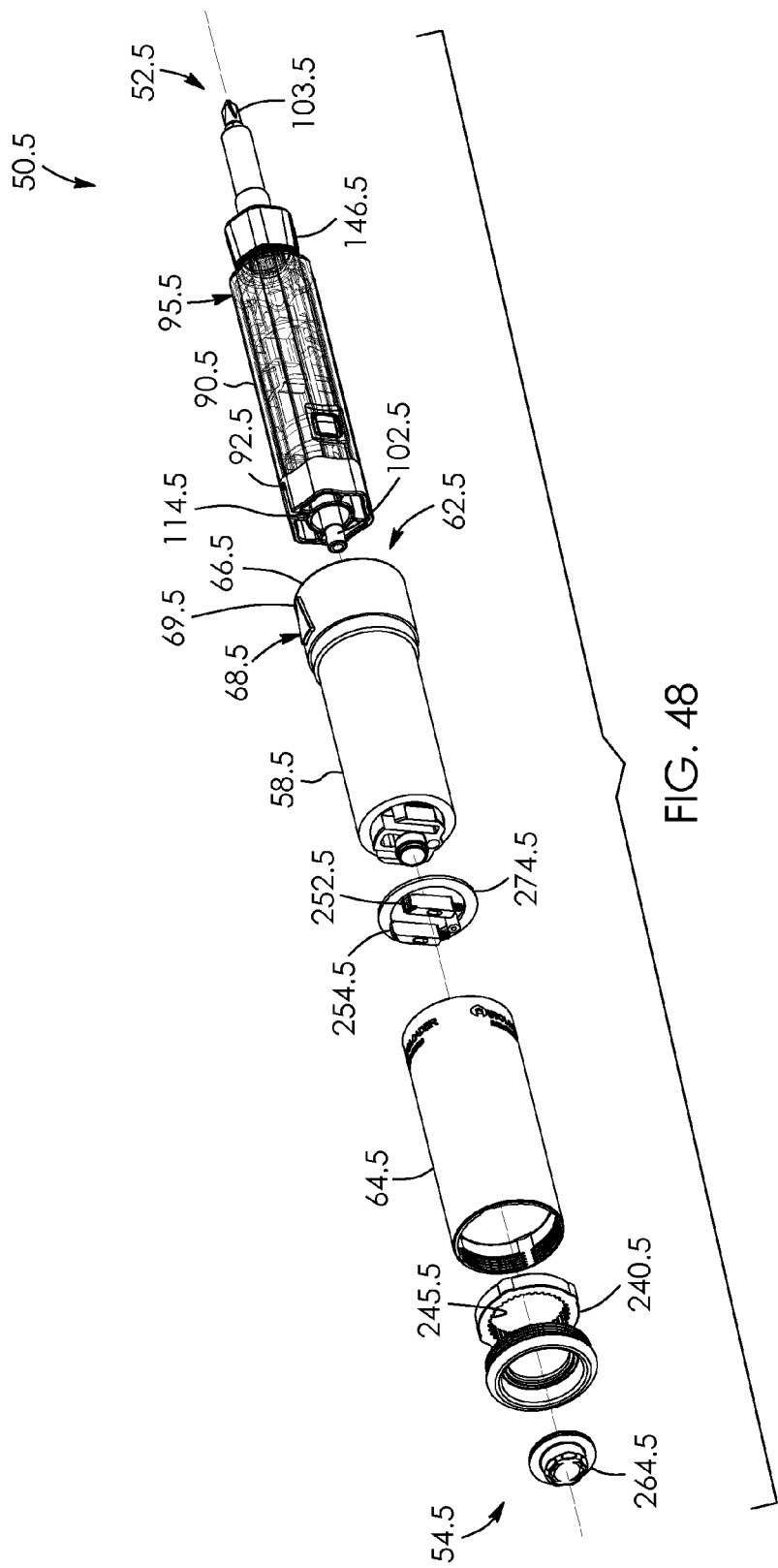
FIG. 48 is an exploded view of a bit tool according to a sixth aspect, in this example in the form of a further screwdriver.

Lastly, as seen in FIGS. 46 and 47, in the reverse position mode, when protrusion 282 is biased towards the teethed-end of its catch member 254 in this example, pin 272 enables outward movement of catch member 254 and pin 270 inwardly biases catch member 252. Selector member 246 in this case is further rotated in the clockwise direction relative to the mode shown in FIG. 44. This enables the handle assembly 56.4 to move in the counter-clockwise, reverse direction shown by arrow 280, with catch member 254 inhibiting rotation in the forward direction shown by arrow 278.

The various desired forward, neutral and reversion positions of the selector member correspond to knob 263 seen in FIG. 36 selectively engaging with various ones of recesses 271 seen in FIG. 40.

FIGS. 48 to 51 show a bit tool, in this example a screwdriver 50.5 according to a sixth aspect. Like parts have like numbers and functions as the screwdriver 50.4 shown in FIGS. 34 to 47 with decimal extension ".5" replacing decimal extension ".4" and being added for parts not previously having decimal extensions. In this case, screwdriver 50.5 is substantially similar to screwdriver 50.4 with one exception being that selector member 264.5 is slidably mounted to the inner core and has a plurality of circumferentially spaced-apart recesses 290 along its forward facing inner surface 292 which selectively engage radially outwardly extending protrusions 294 of core 114.5. In this manner, positioning of the selector member may be selectively retained and snapped into place for positions corresponding to forward, locked neutral and reverse.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. A bit tool comprising:
   a bit storage member shaped to house a plurality of bits, the bit storage member having an exterior which is at least partially transparent; and
   a light assembly shaped to extend around the bit storage member, the light assembly selectively illuminating said bit storage member to reveal the bits.

2. The tool as claimed in claim 1 wherein the light assembly includes a plurality of circumferentially spaced-apart lights positioned around the exterior of the bit storage member.

3. The tool as claimed in claim 1 wherein the exterior of the bit storage member comprises a plurality of longitudinally-extending ridges and a plurality of longitudinally-extending grooves interposed between said ridges and wherein the light assembly includes a plurality of spaced-apart lights, each of said lights aligning with a respective one of the ridges of the bit storage member.

4. The tool as claimed in claim 1 wherein the light assembly includes a lens shaped to extend around the bit storage member.

5. The tool as claimed in claim 1 wherein the light assembly includes a plurality of circumferentially spaced-apart protruding portions and a plurality of lights, the lights aligning with respective ones of the protruding portions of the light assembly.

6. A bit tool having at least one bit, the tool comprising:
   an inner tube having a pair of spaced-apart apertures transversely extending therethrough;
   a pushrod that selectively extends the bit partially outwards from the tube;
   a pair of locking members positioned within respective ones of the apertures of the tube; and
   a collar extending around and slidably connecting to the tube, the collar being moveable to selectively bias the locking members radially inwards to abut the bit and the pushrod, respectively, the bit and the pushrod selectively coupling together thereby.

7. The tool as claimed in claim 6 wherein the collar includes an annular inner surface which abuts the locking members to couple the bit and the pushrod together in a locked mode and wherein the collar includes a pair of spaced-apart recesses which extend radially outwards from said inner surface, the locking members being radially extendable outwards to enable the pushrod to freely move the bit within the tube when said recesses of the collar align with the apertures of the tube.

8. The tool as claimed in claim 6, wherein the pushrod is configured to selectively move the bit from a retracted position within the tool to an extended position, the apertures of the inner tube aligning with respective ones of the pushrod and the bit when the bit is positioned in the extended position.

9. The tool as claimed in claim 6 wherein the bit has an annular groove and wherein the pushrod has an annular groove, the pair of locking members being selectively engageable with the grooves of the bit and the pushrod, respectively.

10. The tool as claimed in claim 6 wherein the collar has a pair of spaced-apart radially outwardly-extending recesses which face the inner tube and wherein the collar is moveable axially outwards to an unlocked mode, the locking members being at least partially received within the recesses of the collar in the unlocked mode.

11. The tool as claimed in claim 6 wherein the inner tube has an inwardly-extending recess which faces the collar, wherein the collar has a pair of spaced-apart outwardly-extending recesses which face the inner tube, wherein the collar has a ball-plunger which resiliency biases against the inner tube, and wherein, when the ball-plunger engages with the recess of the inner tube, the locking members are radially moveable outwards to at least partially be received by the recesses of the collar.

12. A hand tool comprising:
   a longitudinally-extending inner core operatively connected to a bit to be driven;
   at least one catch member operatively connected to and linearly moveable relative to the inner core;
   a handle assembly at least partially extending around and having a plurality of gear teeth facing the inner core, the catch member spring-biasing outwards towards the gear teeth, the gear teeth actuating the catch member inwards when the handle assembly is rotated in a first direction relative to the inner core and the gear teeth fixedly engaging the catch member to couple the handle assembly to the inner core when the handle assembly is rotated in a second direction opposite the first direction; and
   a selector member rotatably connected to the inner core, the selector member being shaped to selectively engage and adjust linear positioning of the catch member.

13. The tool as claimed in claim 12 wherein the catch member is linearly moveable transverse to the inner core and spring-biased in a radially outwards direction.

14. The tool as claimed in claim 12, wherein the inner core has an aperture extending transverse thereto, the catch member extending through the aperture of the inner core.

15. The tool as claimed in claim 14 wherein the catch member has a first end positioned within the aperture of the core and a second end spaced-apart from the first end, the second end of the catch member having at least one tooth shaped to engage with selective ones of the gear teeth of the handle assembly.

16. The tool as claimed in claim 12 wherein the catch member has a slot extending therethrough and wherein the selector member has a protrusion which extends into the slot of the catch member, the protrusion engaging with a portion of the catch member adjacent to a first end of the slot when the selector member moves the catch member from a forward position to a reverse position.

17. The tool as claimed in claim 12 wherein the catch member has a linearly-extending slot and wherein the selector member has a protrusion which extends into the slot of the catch member and through which linear positioning of the catch member is adjustable.

18. The tool as claimed in claim 12, further including a knob operatively connected to the inner core, the knob being spring-biased to abut the selector member, the selector member having a plurality of circumferentially spaced-apart recesses shaped to receive said knob, the selector member enabling the handle assembly to rotate in the first direction relative to the inner core when the knob engages with a first one of the recesses and enabling the handle assembly to rotate in the second direction when the knob engages with a second one of the recesses.

19. The tool as claimed in claim 12 wherein the handle assembly comprises a tubular gripping member having an interior and comprises a ring gear coupled to the interior of the gripping member, the gear teeth being part of the ring gear.

20. The tool as claimed in claim 19, wherein the ring gear has a front face and the tool further includes a thrust washer interposed between the front face of the ring gear and the inner core, the thrust washer enabling the handle assembly to slidably abut with the inner core when the handle assembly is forwardly-rotated against the inner core.

21. A hand tool comprising:
a longitudinally-extending inner core;
a pair of catch members operatively connected to and spring-biased to move linearly outwards relative to the inner core;
a handle assembly extending around and having a plurality of gear teeth facing the inner core; and
a selector member configured to actuate respective ones of the catch members for selectively causing the handle assembly to ratchetly drive the inner core in forward and reverse positions, the selector member being slidably mounted to the inner core and selectively engaging the catch members via a pair of pins.

22. The tool as claimed in claim 21 wherein the selector member inwardly biases a first one of the catch members to enable the handle assembly to drive the inner core in a first direction, wherein the selector member is rotatable to inwardly bias a second one of the catch members to enable the handle assembly to drive the inner core in a second direction opposite the first direction.

23. The tool as claimed in claim 21 wherein the selector is adjustable to enable both of the catch members to extend outwards and engage the gear teeth in a locked, neutral position, promoting coupling of the handle assembly to the inner core when the handle assembly is moved in both the first and second directions.

24. The tool as claimed in claim 21, wherein when the selector member enables only one of the catch members to engage the gear teeth, the handle assembly is rotatable in the direction which enables the gear teeth to inwardly bias said one of the catch members.

25. A hand tool having an exterior and comprising:
a longitudinally-extending inner core operatively connected to a bit to be driven;
at least one catch member operatively connected to and linearly moveable relative to the inner core;
a handle assembly at least partially extending around and having a plurality of gear teeth facing the inner core, the catch member spring-biasing outwards towards the gear teeth, the gear teeth actuating the catch member inwards when the handle assembly is rotated in a first direction relative to the inner core and the gear teeth fixedly engaging the catch member to couple the handle assembly to the inner core when the handle assembly is rotated in a second direction opposite the first direction; and
an anti-roll projection radially extending outwards from the exterior of the tool, the projection being shaped to inhibit the tool from rolling away when not in use.

* * * * *